US010112081B2

(12) United States Patent
Sullivan et al.

(10) Patent No.: US 10,112,081 B2
(45) Date of Patent: Oct. 30, 2018

(54) GOLF BALL INCORPORATING POSITIVE HARDNESS GRADIENT THERMOSET POLYURETHANE OUTER COVER LAYER

(71) Applicant: Acushnet Company, Fairhaven, MA (US)

(72) Inventors: Michael J. Sullivan, Old Lyme, CT (US); Brian Comeau, Berkley, MA (US); Michael Michalewich, Norton, MA (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/805,174

(22) Filed: Nov. 7, 2017

(65) Prior Publication Data
US 2018/0071586 A1  Mar. 15, 2018

Related U.S. Application Data

(63) Continuation-in-part of application No. 15/386,012, filed on Dec. 21, 2016, which is a continuation-in-part of application No. 15/296,298, filed on Oct. 18, 2016, which is a continuation-in-part of application No. 14/943,277, filed on Nov. 17, 2015, now Pat. No. 9,468,811, which is a continuation-in-part of application No. 13/945,707, filed on Jul. 18, 2013, now Pat. No. 9,186,556, which is a continuation-in-part of application No. 13/945,666, filed on Jul. 18, 2013, now Pat. No.
(Continued)

(51) Int. Cl.
*A63B 37/06* (2006.01)
*A63B 37/00* (2006.01)

(52) U.S. Cl.
CPC ...... *A63B 37/0092* (2013.01); *A63B 37/0063* (2013.01); *A63B 37/0076* (2013.01)

(58) Field of Classification Search
CPC .................. A63B 37/0063; A63B 37/0032
USPC ........................................... 473/371
See application file for complete search history.

(56) References Cited

U.S. PATENT DOCUMENTS 3,784,209 A   1/1974  Berman
3,986,802 A  10/1976  Isom
(Continued)

*Primary Examiner* — Raeann Gorden
(74) *Attorney, Agent, or Firm* — Margaret C. Barker

(57) ABSTRACT

Golf ball comprising a positive hardness gradient core and an outer cover layer having a microhardness gradient and being formed from a thermoset polyurethane material throughout, and having: i) a treated region that is contacted with a thermoset polyurethane microhardness-increasing solution consisting of an isocyanate portion and at least one non-aqueous solvent; and ii) an untreated region that is not contacted with the thermoset polyurethane microhardness-increasing solution. The treated region comprises the isocyanate portion, whereas the untreated region does not comprise the isocyanate portion. Treated region has a microhardness $M_1$ that is greater than microhardness $M_2$ of untreated region to define the outer cover layer positive microhardness gradient $\Delta M = M_1 - M_2$. The treated region may have a depth Dtr that extends inward from the cover outer surface and in some embodiments is less than a thickness of the untreated region. Treated region may alternatively extend from the inner surface toward outer surface.

30 Claims, 3 Drawing Sheets

Related U.S. Application Data 9,259,619, which is a continuation-in-part of application No. 13/549,446, filed on Jul. 14, 2012, now Pat. No. 8,672,777, which is a continuation-in-part of application No. 12/891,250, filed on Sep. 27, 2010, now Pat. No. 8,016,696, which is a continuation of application No. 12/056,361, filed on Mar. 27, 2008, now Pat. No. 7,744,490, which is a continuation-in-part of application No. 12/048,665, filed on Mar. 14, 2008, now Pat. No. 7,678,312, which is a continuation-in-part of application No. 11/772,903, filed on Jul. 3, 2007, now Pat. No. 7,537,529, application No. 15/805,174, which is a continuation-in-part of application No. 15/384,414, filed on Dec. 20, 2016, which is a continuation-in-part of application No. 15/138,371, filed on Apr. 26, 2016, now Pat. No. 9,795,836, which is a continuation-in-part of application No. 14/792,803, filed on Jul. 7, 2015, now Pat. No. 9,320,945, which is a continuation of application No. 14/499,320, filed on Sep. 29, 2014, now Pat. No. 9,072,945, which is a continuation of application No. 13/723,469, filed on Dec. 21, 2012, now Pat. No. 8,845,456, which is a continuation of application No. 13/438,947, filed on Apr. 4, 2012, now Pat. No. 8,337,330, which is a continuation of application No. 12/964,343, filed on Dec. 9, 2010, now Pat. No. 8,152,655, which is a continuation-in-part of application No. 12/647,584, filed on Dec. 28, 2009, now Pat. No. 8,500,575, which is a continuation-in-part of application No. 12/558,826, filed on Sep. 14, 2009, now Pat. No. 7,857,714, which is a continuation of application No. 12/186,877, filed on Aug. 6, 2008, now Pat. No. 7,803,069, which is a continuation of application No. 11/832,197, filed on Aug. 1, 2007, now Pat. No. 7,410,429, which is a continuation-in-part of application No. 11/829,461, filed on Jul. 27, 2007, now Pat. No. 7,537,530, which is a continuation-in-part of application No. 11/772,903, filed on Jul. 3, 2007, now Pat. No. 7,537,529.

(56) References Cited

U.S. PATENT DOCUMENTS

| | | |
|---|---|---|
| 4,570,937 A | 2/1986 | Yamada |
| 4,650,193 A | 3/1987 | Molitor et al. |
| 5,033,748 A | 7/1991 | Ebisuno |
| 5,334,673 A | 8/1994 | Wu |
| 5,484,870 A | 1/1996 | Wu |
| 5,516,110 A | 5/1996 | Yabuki et al. |
| 5,697,856 A | 12/1997 | Moriyama et al. |
| 5,730,664 A | 3/1998 | Asakura et al. |
| 5,733,206 A | 3/1998 | Nesbitt et al. |
| 5,782,707 A | 7/1998 | Yamagishi et al. |
| 5,803,831 A | 9/1998 | Sullivan et al. |
| 5,803,834 A | 9/1998 | Yamagishi et al. |
| 5,957,784 A | 9/1999 | Asakura et al. |
| 5,976,443 A | 11/1999 | Nesbitt et al. |
| 6,113,831 A | 9/2000 | Nesbitt et al. |
| 6,319,154 B1 | 11/2001 | Yoshida et al. |
| 6,394,913 B1 | 5/2002 | Nesbitt et al. |
| 6,432,342 B1 | 8/2002 | Nesbitt et al. |
| 6,494,793 B1 | 12/2002 | Ohama |
| 6,494,794 B1 | 12/2002 | Ohama |
| 6,506,851 B2 | 1/2003 | Wu |
| 6,533,683 B2 | 3/2003 | Watanabe |
| 6,537,158 B2 | 3/2003 | Watanabe |
| 6,632,147 B2 | 10/2003 | Cavallaro et al. |
| 6,659,888 B2 | 12/2003 | Endo |
| 6,679,791 B2 | 1/2004 | Watanabe |
| 6,689,860 B2 | 2/2004 | Iwami |
| 6,739,986 B2 | 5/2004 | Higuchi et al. |
| 6,759,482 B1 | 7/2004 | Yokota |
| 6,805,644 B1 | 10/2004 | Moriyama et al. |
| 6,815,521 B2 | 11/2004 | Iwami |
| 6,835,794 B2 | 12/2004 | Wu et al. |
| 6,837,803 B2 | 1/2005 | Nanba et al. |
| 6,855,070 B2 | 2/2005 | Hogge et al. |
| 6,921,345 B2 | 7/2005 | Higuchi et al. |
| 6,932,720 B2 | 8/2005 | Hogge et al. |
| 7,004,854 B2 | 2/2006 | Hogge et al. |
| 7,153,224 B2 | 12/2006 | Higuchi et al. |
| 7,182,702 B2 | 2/2007 | Hogge et al. |
| 7,344,455 B1 | 3/2008 | Higuchi |
| 7,727,085 B2 | 6/2010 | Higuchi et al. |
| 7,744,490 B2 | 6/2010 | Sullivan et al. |
| 8,016,696 B2 | 9/2011 | Sullivan et al. |
| 8,152,655 B2 | 4/2012 | Comeau et al. |
| 8,221,266 B2 | 7/2012 | Sullivan et al. |
| 8,257,199 B2 | 9/2012 | Sullivan et al. |
| 8,337,330 B2 | 12/2012 | Comeau et al. |
| 2003/0078115 A1 | 4/2003 | Kennedy et al. |
| 2003/0176242 A1 | 9/2003 | Mano et al. |
| 2003/0236135 A1 | 12/2003 | Hogge et al. |
| 2004/0029648 A1 | 2/2004 | Kato |
| 2005/0176523 A1 | 8/2005 | Boehm et al. |
| 2013/0157781 A1 | 6/2013 | Sullivan et al. |

GOLF BALL INCORPORATING POSITIVE HARDNESS GRADIENT THERMOSET POLYURETHANE OUTER COVER LAYER

CROSS-REFERENCE TO RELATED APPLICATIONS

This application is a continuation-in-part of co-pending U.S. patent application Ser. No. 15/386,012, filed Dec. 21, 2016, which is a continuation-in-part of co-pending U.S. patent application Ser. No. 15/296,298, filed Oct. 18, 2016, which is a continuation-in-part of U.S. patent application Ser. No. 14/943,277, filed Nov. 17, 2015 and now U.S. Pat. No. 9,468,811, which is a continuation of U.S. patent application Ser. No. 13/945,707, filed Jul. 18, 2013 and now U.S. Pat. No. 9,186,556, which is a continuation-in-part of U.S. patent application Ser. No. 13/945,666, filed Jul. 18, 2013 and now U.S. Pat. No. 9,259,619, which is a continuation-in-part of U.S. patent application Ser. No. 13/549,446, filed Jul. 14, 2012 and now U.S. Pat. No. 8,672,777, which is a continuation of U.S. patent application Ser. No. 12/891,250, filed Sep. 27, 2010 and now U.S. Pat. No. 8,016,696, which is a continuation of U.S. patent application Ser. No. 12/056,361, filed Mar. 27, 2008 and now U.S. Pat. No. 7,744,490, which is a continuation-in-part of U.S. patent application Ser. No. 12/048,665, filed Mar. 14, 2008 and now U.S. Pat. No. 7,678,312, which is a continuation-in-part of U.S. patent application Ser. No. 11/772,903, filed Jul. 3, 2007 and now U.S. Pat. No. 7,537,529.

This application is also a continuation-in-part of co-pending U.S. patent application Ser. No. 15/386,005, filed Dec. 21, 2016, which is a continuation-in-part of U.S. patent application Ser. No. 15/296,298, filed Oct. 18, 2016 which is also related to other applications as set forth above.

This application is further a continuation-in-part of co-pending U.S. patent application Ser. No. 15/384,414, filed Dec. 20, 2016, which is a continuation-in-part of co-pending U.S. patent application Ser. No. 15/138,371, filed Apr. 26, 2016, which is a continuation-in-part of U.S. patent application Ser. No. 14/792,803, filed Jul. 7, 2015 and now U.S. Pat. No. 9,320,945, which is a continuation of U.S. patent application Ser. No. 14/499,320, filed Sep. 29, 2014 and now U.S. Pat. No. 9,072,945, which is a continuation of U.S. patent application Ser. No. 13/723,469, filed Dec. 21, 2012 and now U.S. Pat. No. 8,845,456, which is a continuation of U.S. patent application Ser. No. 13/438,947, filed Apr. 4, 2012 and now U.S. Pat. No. 8,337,330, which is a continuation of U.S. patent application Ser. No. 12/964,343, filed Dec. 9, 2010 and now U.S. Pat. No. 8,152,655, which is a continuation-in-part of co-pending U.S. patent application Ser. No. 12/647,584, filed Dec. 28, 2009 and now U.S. Pat. No. 8,500,575, which is a continuation-in-part of U.S. patent application Ser. No. 12/558,826, filed Sep. 14, 2009 and now U.S. Pat. No. 7,857,714, which is a continuation of U.S. patent application Ser. No. 12/186,877, filed Aug. 6, 2008 and now U.S. Pat. No. 7,803,069, which is a continuation of U.S. patent application Ser. No. 11/832,197, filed Aug. 1, 2007 and now U.S. Pat. No. 7,410,429, which is a continuation-in-part of U.S. patent application Ser. No. 11/829,461, filed Jul. 27, 2007 and now U.S. Pat. No. 7,537,530, which is a continuation-in-part of U.S. patent application Ser. No. 11/772,903, filed Jul. 3, 2007 and now U.S. Pat. No. 7,537,529. The disclosure of every related application identified above is hereby incorporated herein by reference in its entirety.

FIELD OF THE INVENTION

This invention relates generally to golf balls having hardness gradients within and between core layers and cover layers and in particular wherein one of the layers having a hardness gradient is formed from a thermoset polyurethane material.

BACKGROUND OF THE INVENTION

Both professional and amateur golfers use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

Three-piece, four-piece, and even five-piece balls have become more popular over the years. More golfers are playing with these multi-piece balls for several reasons including new manufacturing technologies, lower material costs, and desirable ball playing performance properties. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a single or multi-layered cover to provide a final ball assembly. Different materials are used in these golf ball constructions to impart specific properties and playing features to the ball.

For instance, in recent years, there has been high interest in using polyurethane compositions to make golf ball covers. Generally, polyurethane compositions contain urethane linkages formed by reacting an isocyanate group (—N=C=O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents.

In Sullivan et al., U.S. Pat. No. 5,971,870, thermoplastic or thermosetting polyurethanes and ionomers are described as being suitable materials for making outer cover and any inner cover layer. The cover layers can be formed over the cores by injection-molding, compression molding, casting or other conventional molding techniques. Preferably, each cover layer is separately formed. In one embodiment, the inner cover layer is first injection molded over the core in a cavity mold, subsequently any intermediate cover layers are injection molded over the inner cover layer in a cavity mold, and finally the outer cover layer is injection molded over the intermediate cover layers in a dimpled cavity mold.

In Sullivan et al., U.S. Pat. No. 7,131,915, the outer cover can be made from a polyurethane composition and various aliphatic and aromatic diisocyanates are described as being suitable for making the polyurethanes. Depending on the type of curing agent used, the polyurethane composition may be thermoplastic or thermoset in nature. Sullivan '915 further discloses that compositions for the intermediate cover layer and inner cover layer may be selected from the same class of materials as used for the outer cover layer. In other embodiments, ionomers such as HNPs, can be used to form the intermediate and inner cover layers. The castable, reactive liquid used to form the urethane elastomer material can be applied over the core using a variety of techniques such as spraying, dipping, spin coating, or flow coating methods.

Golf ball manufacturers often prefer thermoset polyurethane covers over thermoplastic polyurethane covers due to the excellent mechanical strength, impact durability, and cut and scuff (groove shear)-resistance of the former compared with the latter. In thermoset polyurethanes, a high degree of covalent cross-linking occurs, creating chemical bonds that are irreversibly set when the material is cured and which cannot be broken when exposed to heat. In contrast, thermoplastic polyurethanes have different bonds that can be reversibly broken by increasing temperature such as during molding or extrusion. Therefore, thermoplastic polyurethane cover layers aren't typically used without first treating the materials in some manner in an attempt to improve mechanical strength, impact durability, and cut and scuff (groove shear)-resistance.

Regardless, it is sometimes desirable to meanwhile create a hardness gradient in the cover layer in order to achieve desired golf ball characteristics including unique combinations of desired resilience, durability, compression, "feel," and spin. In this regard, having a cover surface that is harder than the inner surface is one such desirable construction. For example, U.S. Pat. Nos. 8,523,708 and 8,747,254 of Sullivan et al. discloses golf balls having thermoset or thermoplastic polyurethane covers wherein the cover surface is hardened by treating the cover surface with and incorporating therein a fatty acid and/or fatty acid salt composition.

The fatty acid and/or fatty acid salt composition penetrates and embeds the cover surface and includes not only fatty acids and/or fatty acid salts but hardening ingredients as well such as zinc methacrylate, zinc dimethacylate, a thermoplastic resin and/or peroxide since fatty acids/fatty acid salts typically soften rather than harden materials. The fatty acid and/or fatty acid salt composition includes the hardening/stiffening material in an amount of from about 1 wt % to about 50 wt %. The weight % of the hardening/stiffening material in the fatty acid and/or fatty acid salt composition may be modified to achieve a cover layer outer surface hardness α that is greater than, less than, or even substantially similar to the cover layer inner surface hardness β, depending on the golf ball characteristic being targeted. Sullivan et al. teaches that the fatty acid and/or fatty acid salt compliments the stiffening agent by embedding itself between polymer chains, spacing the chains apart, and thereby increasing free volume in the material for penetration.

However, given that fatty acids/fatty acid salts generally soften rather than harden materials, it would be beneficial to develop golf balls wherein a thermoset polyurethane cover layer surface can be hardened with ingredients which simultaneously penetrate and harden the thermoset polyurethane cover surface without the need for fatty acids/fatty acid salts and without meanwhile causing the cover surface to become unduly brittle.

Such golf balls, if meanwhile also producible cost effectively within existing golf ball manufacturing processes and without sacrificing the mechanical strength, impact durability, and cut and scuff resistance of conventional thermoset polyurethane cover layers, would be particularly desirable. The golf balls of the invention and methods of making same address and solve this need.

SUMMARY OF THE INVENTION

A golf ball comprises a core and an outer cover layer. The core has an outer surface, a geometric center, and a soft transition region adjacent to the outer surface, the soft transition region having a thickness of about 4 mm or less and comprising about 10 percent to about 45 percent of a trans-polybutadiene isomer. The core also has an outer surface hardness greater than a hardness at the geometric center to define a positive hardness gradient of about 12 Shore C to 68 Shore C; and a secondary gradient quotient, GQ', from about 4 to 13, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s.

Meanwhile, the outer cover layer is formed from a thermoset polyurethane material throughout and has a treated region including at least a cover outer surface and an untreated region extending from a cover inner surface to the treated region. The treated region is contacted with a thermoset polyurethane microhardness-increasing solution consisting of an isocyanate portion and at least one non-aqueous solvent. The treated region comprises the isocyanate portion and has a microhardness $M_1$ that is greater than a microhardness $M_2$ of the untreated region, wherein the untreated region is not contacted with the thermoset polyurethane microhardness-increasing solution and does not comprise the isocyanate portion.

The outer cover layer has a positive microhardness gradient of $\Delta M = M_1 - M_2$, wherein $M_1$ is greater than $M_2$ by up to 1 Shore M hardness point. In another embodiment, the outer cover layer has a positive microhardness gradient of $\Delta M = M_1 - M_2$, wherein $M_1$ is greater than $M_2$ by up to about 10 Shore M hardness points. In yet another embodiment, the outer cover layer has a positive microhardness gradient of $\Delta M = M_1 - M_2$, wherein $M_1$ is greater than $M_2$ by greater than 10 Shore M hardness points.

The treated region may extend inward from the cover outer surface a depth Dtr that is less than a thickness of the cover layer. In one embodiment, the treated region may extend inward from the cover outer surface a depth Dtr that is less than a thickness of the untreated region. In one such embodiment, depth Dtr is from about 10 μm to about 350 μm.

In one embodiment, the isocyanate portion consists of at least one of tolylene-2,6-diisocyanate, tolylene-2,4-diisocyanate, 2,2' diphenylmethanediisocyanate, 2,4' diphenylmethanediisocyanate, 4,4'-diphenylmethanediisocyanate, polymethylene polyphenyl polyisocyanate, 1,5-diisocyanatonaphthalene, isophorone diisocyanate (including isomer mixtures), 4,4'-dicyclohexylmethane diisocyanate, hexamethylene-1,6-diisocyanate, m-xylylene diisocyanate, 1,6-hexamethylene diisocyanate, hydrogenated xylylene diisocyanate, tolidine diisocyanate, norbornene diisocyanate, derivatives thereof, and combinations thereof.

In one such embodiment, the solvent may be selected from ketones, acetates, alcohols, acetic acid and acetic anhydride, aromatic hydrocarbons, esters, polyesters, polyethers, and combinations thereof. For example, the ketone may be dimethylketone (acetone).

In one embodiment, the treated outer surface is cross-linked by a reaction between active hydrogen functionality of the molded thermoset polyurethane material and isocyanates of the isocyanate portion.

The treated outer surface may be exposed to a catalyst solution comprising an organometallic compound and a non-aqueous solvent and wherein the treated region comprises the organometallic compound.

In one embodiment, the molded thermoset polyurethane material is formed from an isocyanate-containing prepolymer and at least one chain extender in an amount sufficient to provide an isocyanate index of at least about 115. In one embodiment, the molded thermoset polyurethane material is formed from an isocyanate-containing prepolymer and at least one chain extender in an amount sufficient to provide an isocyanate index of 95 or less.

The at least one chain extender may comprise multifunctional polyols, polyamines, polyamides, polymercaptans, polyacids, polyester-based polyols, polybutadiene-based polyols, diamines, diacids and mixtures thereof.

The outer cover surface may be exposed to and contains at least one excess hydroxyl-functional group-containing ingredient prior to contacting the thermoset polyurethane microhardness-increasing solution and comprsing the isocyanate portion. The hydroxyl-functional group-containing ingredient may be butane diol for example.

In one embodiment, the isocyanate portion comprises at least one isocyanate that is different than each isocyanate of the thermoset polyurethane material of the cover.

In one embodiment, the positive hardness gradient of the core is about 12 Shore C to 45 Shore C and $M_1$ is greater than 50 Shore M. In another embodiment, the positive hardness gradient of the core is about 12 Shore C to 45 Shore C and $M_1$ is from 70 Shore M and to 90 Shore M. In yet another embodiment, the positive hardness gradient of the core is about 12 Shore C to 45 Shore C and $M_1$ is greater than 90 Shore M.

In one embodiment, the secondary gradient quotient, GQ', is about 3.75 to about 12.75.

In a different embodiment, the positive hardness gradient is about 10 Shore C to 48 Shore C and GQ' is from about 1.5 to 7.5.

In yet another embodiment, a golf ball of the invention comprises a core, an inner cover layer and an outer cover layer. The core has a first outer surface and a geometric center; wherein the first outer surface has a hardness of about 68 Shore C to 92 Shore C, the geometric center has a hardness of about 45 Shore C to 85 Shore C, and the first outer surface hardness is greater than the geometric center hardness by about 5 to 21 Shore C to define a positive hardness gradient. The inner cover layer comprises an ionomeric material and has a material hardness of about 60 Shore D or greater; and the outer cover layer comprises a thermoset polyurethane composition throughout and has i) a treated region including at least a cover outer surface and having a material hardness of about 60 Shore M or greater; and ii) an untreated region extending from a cover inner surface to the treated region. The treated region is contacted with a thermoset polyurethane microhardness-increasing solution consisting of an isocyanate portion and at least one non-aqueous solvent and comprises the isocyanate portion and has a microhardness $M_1$ that is greater than the material hardness of the untreated region. Meanwhile, the untreated region is not contacted with the thermoset polyurethane microhardness-increasing solution and does not comprise the isocyanate portion.

BRIEF DESCRIPTION OF THE DRAWINGS

These and other aspects of the present invention may be more fully understood with reference to, but not limited by, the following drawings.

DETAILED DESCRIPTION OF THE INVENTION

Figure 1:
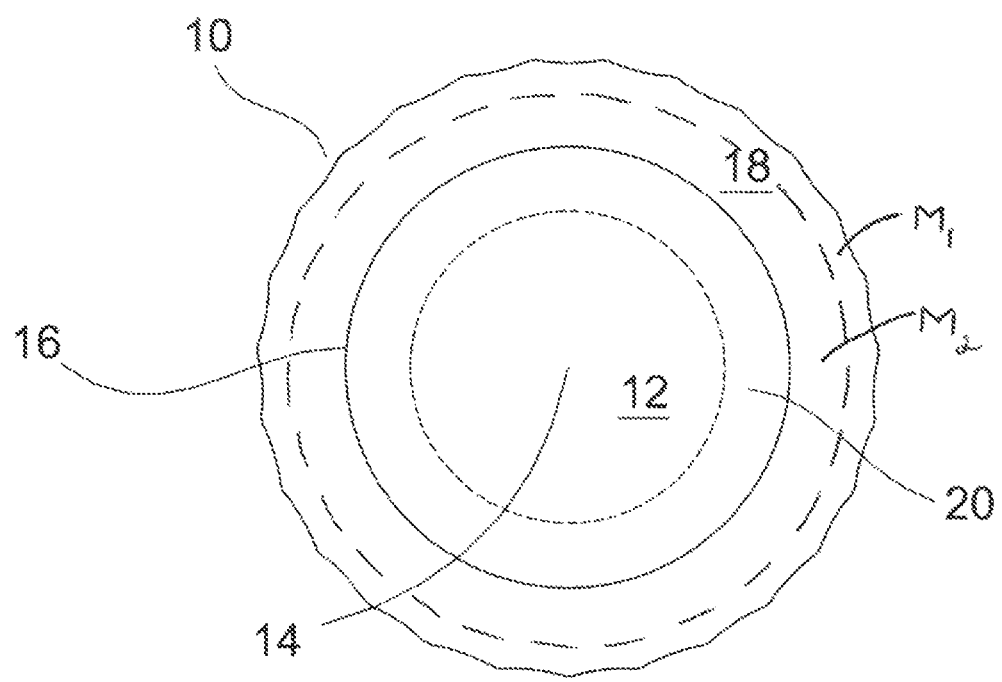
FIG. 1 is a representative cross section of a golf ball of the invention.

A golf ball of the invention incorporates a core having a positive hardness gradient and at least one durable thermoset polyurethane cover layer having a treated region extending inward from its outer surface that is harder than an untreated region that extends from an inner surface of the cover to the treated region (positive hardness gradient). Advantageously, in a golf ball of the invention, a hardness gradient is created in a thermoset polyurethane layer (e.g. cover) without the need for a fatty acid/fatty salt. Meanwhile, the gold ball is producible within existing golf ball manufacturing processes cost effectively and has excellent mechanical strength, impact durability, and cut and scuff (groove shear)-resistance. Creating the microhardness gradient within a single layer of thermoset polyurethane material reduces golf ball manufacturing costs associated with adding additional layers and also eliminates any possible adhesion problems that might otherwise arise between adjacent layers having the different hardnesses.

Polyurethane compositions contain urethane linkages formed by reacting an isocyanate group (—N=C=O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents.

Polyurethane compositions may be thermoset or thermoplastic in nature, depending on the types and quantities of these ingredients used. For example, thermoset polyurethane compositions are cross-linked polymers and are typically produced from the reaction of one or more isocyanates and one or more polyols at normally a 1.05:1 stoichiometric ratio. Thermoplastic polyurethane compositions, on the other hand, are typically formed by reacting isocyanate(s) and polyol(s) at a 1:1 stoichiometric ratio.

Thermoset polyurethanes have cross-linking bonds that become irreversibly set upon cure. That is, the polymer chains are chemically joined together in places by covalent bonds that cannot be broken when exposed to heat and are therefore known to have high mechanical strength, impact durability, and cut and scuff (groove shear)-resistance. On the other hand, in thermoplastic polyurethanes, any bonding in the polymer network is primarily through a physical mechanism such as hydrogen bonding. Thus, any bonds in thermoplastic polyurethanes can be reversibly broken by increasing temperature such as during molding or extrusion. The thermoplastic material therefore softens when exposed to heat and then returns to its original condition when cooled. Thus, thermoplastic polyurethanes typically have poorer mechanical strength, impact durability, and cut and scuff (groove shear)-resistance.

Advantageously, the thermoset polyurethane microhardness-increasing solution is in liquid form at room temperature and therefore the outer surface of the cover can be treated without directly exposing the cover outer surface to heat. The step of treating typically includes but is not limited to dipping, soaking, or otherwise immersing the untreated golf ball cover outer surface in the thermoset polyurethane microhardness-increasing solution. Embodiments are indeed also envisioned wherein the cover outer surface may be exposed to/contact the mixture via coating, rolling, spraying, and/or dusting.

Advantageously, the treatment duration may be less than 15 minutes in most embodiments, which makes producing the resulting golf balls of the invention desirably simple and cost effective. The duration of treatment can be varied to target the desired resulting microhardness gradient, with the limitation being that longer treatment durations generally create higher microhardness gradients between the treated and untreated regions of the cover. In this regard, in certain embodiments, the golf ball may be dipped or otherwise immersed in the thermoset polyurethane microhardness-increasing solution for a duration of from about 60 seconds to 10 minutes.

In another such embodiment, the golf ball may be soaked in the thermoset polyurethane microhardness-increasing solution for a duration of from 60 seconds to about 3 minutes. In another such embodiment, the golf ball may be soaked in the thermoset polyurethane microhardness-increasing solution for a duration of from 60 seconds to about 3 minutes. In yet another such embodiment, the golf ball may be soaked in the thermoset polyurethane microhardness-increasing solution for a duration of from under 60 seconds to about 3 minutes. In still another such embodiment, the golf ball may be soaked in the thermoset polyurethane microhardness-increasing solution for a duration of from 2 minutes to about 7 minutes.

In some embodiments, the mixture itself may be heated prior to contacting the cover outer surface such as via a thermal spray. Additionally or alternatively, the golf ball cover outer surface may be exposed to heat following treatment with the mixture.

In one embodiment, a golf ball of the invention comprises a core and an outer cover layer. The core has an outer surface, a geometric center, and a soft transition region adjacent to the outer surface, the soft transition region having a thickness of about 4 mm or less and comprising about 10 percent to about 45 percent of a trans-polybutadiene isomer. The core also has an outer surface hardness greater than a hardness at the geometric center to define a positive hardness gradient of about 12 Shore C to 68 Shore C; and a secondary gradient quotient, GQ', from about 4 to 13, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s.

Meanwhile, the outer cover layer is formed from a thermoset polyurethane material throughout and has a treated region including at least a cover outer surface and an untreated region extending from a cover inner surface to the treated region. The treated region is contacted with a thermoset polyurethane microhardness-increasing solution consisting of an isocyanate portion and at least one non-aqueous solvent. The treated region comprises the isocyanate portion and has a microhardness $M_1$ that is greater than a microhardness $M_2$ of the untreated region, wherein the untreated region is not contacted with the thermoset polyurethane microhardness-increasing solution and does not comprise the isocyanate portion.

Even a slight microhardness difference between the microhardness of the treated region and the microhardness of the untreated region can change golf ball characteristics such as spin, distance, feel, etc. Thus, the outer cover layer may have a positive microhardness gradient of $\Delta M = M_1 - M_2$, wherein $M_1$ is greater than $M_2$ by up to about 1 Shore M microhardness point. In another embodiment, $\Delta M$ may be up to about 10 Shore M microhardness points. In yet another embodiment, $\Delta M$ may be greater than 10 Shore M microhardness points. In alternative embodiments, $\Delta M$ may be up to 1 Shore M microhardness point; or up to about 5 microhardness points; or up to 5 microhardness points; or greater than 10 Shore M microhardness points and up to about 20 Shore M microhardness points; or greater than 5 Shore M microhardness points and up to 15 Shore M microhardness points; or between 10 Shore M and 20 Shore M microhardness points; or 20 Shore M microhardness points or greater; or between 20 Shore M and 40 Shore M microhardness points; or about 40 Shore M microhardness points or greater.

While the hardness of the outer cover layer (or any other such inventive golf ball layer) is defined herein in terms of Shore M microhardness, alternative embodiments are indeed envisioned wherein the hardness gradient may be defined in terms of Shore D layer hardness. For example, the outer cover layer may have a positive Shore D layer hardness gradient of $\Delta D = D_1 - D_2$, wherein $D_1$ is greater than $D_2$ by up to 2 Shore D hardness points, or up to about 5 Shore D hardness points. In other embodiments, $\Delta D$ may be greater than 5 to about 10 Shore D hardness points. And embodiments are also envisioned wherein $\Delta D$ may be greater than 10 Shore D hardness points.

The treated region may extend inward from the cover outer surface a depth Dtr that is less than a thickness of the cover layer. In one embodiment, the treated region may extend inward from the cover outer surface a depth Dtr that is less than a thickness of the untreated region. In one such embodiment, depth Dtr is from about 10 μm to about 350 μm.

The overall thickness of the outer cover layer may be any known thickness such as from about 0.010 inches to about 0.050 inches.

A "thermoset" as used herein is intended to mean a material that cross-links or cures via interaction with a crosslinking or curing agent/chain extender. Crosslinking may be induced by energy, such as heat, through a chemical reaction (by reaction with a curing agent), or by irradiation. The resulting composition remains rigid when set, and does not soften with heating. Thermosets have this property because the long-chain polymer molecules crosslink with each other to give a rigid structure. A thermoset material cannot be melted and re-molded after it is cured. Thus thermosets do not lend themselves to recycling unlike thermoplastics, which can be melted and re-molded. As used herein, the term "thermoset polyurethane material" excludes blends of thermoset polyurethanes with thermoplastic polyurethanes.

In one embodiment, the isocyanate portion consists of at least one of tolylene-2,6-diisocyanate, tolylene-2,4-diisocyanate, 2,2' diphenylmethanediisocyanate, 2,4' diphenylmethanediisocyanate, 4,4'-diphenylmethanediisocyanate, polymethylene polyphenyl polyisocyanate, 1,5-diisocyanatonaphthalene, isophorone diisocyanate (including isomer mixtures), 4,4'-dicyclohexylmethane diisocyanate, hexamethylene-1,6-diisocyanate, m-xylylene diisocyanate, 1,6-hexamethylene diisocyanate, hydrogenated xylylene diisocyanate, tolidine diisocyanate, norbornene diisocyanate, derivatives thereof, and combinations thereof.

In one such embodiment, the solvent may be selected from ketones, acetates, alcohols, acetic acid and acetic anhydride, aromatic hydrocarbons, esters, polyesters, polyethers, and combinations thereof. For example, the ketone may be dimethylketone (acetone).

In one embodiment, the treated outer surface is cross-linked by a reaction between active hydrogen functionality of the molded thermoset polyurethane material and isocyanates of the isocyanate portion.

The treated outer surface may be exposed to a catalyst solution comprising an organometallic compound and a non-aqueous solvent and wherein the treated region comprises the organometallic compound.

In one embodiment, the molded thermoset polyurethane material is formed from an isocyanate-containing prepolymer and at least one chain extender in an amount sufficient to provide an isocyanate index of at least about 115. In one embodiment, the molded thermoset polyurethane material is formed from an isocyanate-containing prepolymer and at least one chain extender in an amount sufficient to provide an isocyanate index of 95 or less.

The at least one chain extender may comprise multifunctional polyols, polyamines, polyamides, polymercaptans, polyacids, polyester-based polyols, polybutadiene-based polyols, diamines, diacids and mixtures thereof.

The outer cover surface may be exposed to and contains at least one excess hydroxyl-functional group-containing ingredient prior to contacting the thermoset polyurethane microhardness-increasing solution and comprising the isocyanate portion. The hydroxyl-functional group-containing ingredient may be butane diol for example.

In one embodiment, the isocyanate portion comprises at least one isocyanate that is different than each isocyanate of the thermoset polyurethane material of the cover.

In one embodiment, the positive hardness gradient of the core may be about 12 Shore C to 45 Shore C and $M_1$ may be greater than 50 Shore M. In another embodiment, the positive hardness gradient of the core is about 12 Shore C to 45 Shore C and $M_1$ is from 70 Shore M and to 90 Shore M. In yet another embodiment, the positive hardness gradient of the core is about 12 Shore C to 45 Shore C and $M_1$ is greater than 90 Shore M.

In one embodiment, the secondary gradient quotient, GQ', is about 3.75 to about 12.75.

In a different embodiment, the positive hardness gradient of the core is about 10 Shore C to 48 Shore C and GQ' is from about 1.5 to 7.5.

In other embodiments, the positive hardness gradient of the core is preferably about 12 Shore C to 45 Shore C, or about 14 Shore C to 35 Shore C, or about 16 Shore C to 30 Shore C. The core has a COR of about 0.790 or greater, or about 0.810 to about 0.825. The secondary gradient quotient, GQ', is about 3.75 to about 12.75, or about 5 to about 11.

In one construction, the golf ball includes an inner cover layer comprising an ionomer (or an HNP). The ionomer may include a lithium ionomer or a sodium ionomer or a blend thereof. The golf ball may also include an outer core layer disposed about the core to form a dual core. The golf ball may also include at least one coating layer disposed about the cover layer. The coating layer, which typically has a thickness of about 0.001 inches to about 0.003 inches, may have a Shore M hardness of about 60 Shore M or less and/or an instrumented hardness of about 1 to 23 MPa.

In one embodiment, the soft transition region comprises about 15 percent to about 40 percent of a trans-polybutadiene isomer. The geometric center of the core includes about 10 percent to about 35 percent trans-polybutadiene isomer and the surface of the core includes about 30 percent to about 50 percent trans-polybutadiene isomer.

In yet another embodiment, a golf ball of the invention comprises a core, an inner cover layer and an outer cover layer. The core has a first outer surface and a geometric center; wherein the first outer surface has a hardness of about 68 Shore C to 92 Shore C, the geometric center has a hardness of about 45 Shore C to 85 Shore C, and the first outer surface hardness is greater than the geometric center hardness by about 5 to 21 Shore C to define a positive hardness gradient. The inner cover layer comprises an ionomeric material and has a material hardness of about 60 Shore D or greater; and the outer cover layer comprises a thermoset polyurethane composition throughout and has i) a treated region including at least a cover outer surface and having a material hardness of about 60 Shore M or greater; and ii) an untreated region extending from a cover inner surface to the treated region. The treated region is contacted with a thermoset polyurethane microhardness-increasing solution consisting of an isocyanate portion and at least one non-aqueous solvent and comprises the isocyanate portion and has a microhardness $M_1$ that is greater than the material hardness of the untreated region. Meanwhile, the untreated region is not contacted with the thermoset polyurethane microhardness-increasing solution and does not comprise the isocyanate portion.

It is also envisioned that a golf ball of the invention may consist of a subassembly surround by a cover layer comprising a thermoset polyurethane composition throughout and having i) a treated region including at least a cover outer surface and having a material hardness of about 60 Shore M or greater; and ii) an untreated region extending from a cover inner surface to the treated region. Once again, the treated region is contacted with a thermoset polyurethane microhardness-increasing solution consisting of an isocyanate portion and at least one non-aqueous solvent and comprises the isocyanate portion and has a microhardness $M_1$ that is greater than the material hardness of the untreated region. Meanwhile, the untreated region is not contacted with the thermoset polyurethane microhardness-increasing solution and does not comprise the isocyanate portion.

In alternative embodiments, such cover layers may consist of the thermoset polyurethane composition throughout and have the treated region and untreated region as defined herein.

Embodiments are also envisioned wherein the outer cover layer is formed from a thermoset polyurethane material throughout and the treated region includes at least a cover inner surface while the cover outer surface is untreated. In these embodiments, the treated region extends from the cover inner surface to the untreated region. The treated region is contacted with the thermoset polyurethane microhardness-increasing solution consisting of an isocyanate portion and at least one non-aqueous solvent. The treated region comprises the isocyanate portion, and the microhardness $M_2$ (now a treated region) is greater than the microhardness $M_1$ of the now untreated region, wherein the untreated region is not contacted with the thermoset polyurethane microhardness-increasing solution and does not comprise the isocyanate portion. Thus, in these embodiments, the outer cover layer has a negative microhardness gradient of $\Delta M = M_1 - M_2$, wherein $M_1$ is less or lower than $M_2$.

Preferred thermoset materials for the outer cover layer (and any other layer so treated) include, but are not limited to: (1) thermoset polyurethanes, such as those prepared from polyols and diisocyanates or polyisocyanates and/or their prepolymers, and those disclosed in U.S. Pat. Nos. 5,334,673 and 6,506,851; (2) thermoset polyureas, such as those disclosed in U.S. Pat. Nos. 5,484,870 and 6,835,794; and (3) thermoset polyurethane-urea hybrids, blends or copolymers comprising urethane and urea segments.

Suitable polyurethane compositions comprise a reaction product of at least one polyisocyanate and at least one curing agent. The curing agent can include, for example, one or more polyamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent. Suitable polyurethanes are described in U.S. Patent Application Publication No. 2005/0176523, which is incorporated by reference in its entirety.

Any polyisocyanate available to one of ordinary skill in the art is suitable for use according to the invention. Exemplary polyisocyanates include, but are not limited to, 4,4'-diphenylmethane diisocyanate (MDI); polymeric MDI; carbodiimide-modified liquid MDI; 4,4'-dicyclohexylmethane diisocyanate ($H_{12}$MDI); p-phenylene diisocyanate (PPDI); m-phenylene diisocyanate (MPDI); toluene diisocyanate (TDI); 3,3'-dimethyl-4,4'-biphenylene diisocyanate; isophoronediisocyanate; 1,6-hexamethylene diisocyanate (HDI); naphthalene diisocyanate; xylene diisocyanate; p-tetramethylxylene diisocyanate; m-tetramethylxylene diisocyanate; ethylene diisocyanate; propylene-1,2-diisocyanate; tetramethylene-1,4-diisocyanate; cyclohexyl diisocyanate; dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate; tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term MDI includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer isocyanate groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups, or less than 9% unreacted NCO groups, or less than 8.5% unreacted NCO groups, or less than 8% unreacted NCO groups, or less than 7.5% unreacted NCO groups, or less than 7% unreacted NCO groups, or less than 6.5% unreacted NCO groups, or less than 6% unreacted NCO groups, or less than 5.5% unreacted NCO groups, or less than 5% unreacted NCO groups. Preferably, the at least one polyisocyanate has no greater than about 8.0% NCO, or no greater than about 7.5%, or no greater than about 7.0% NCO, with a level of NCO of about 6.5% NCO or 6.0% NCO or 5.5% NCO or 5.0% NCO commonly used.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline; m-phenylenediamine; 4,4'-methylene-bis-(2-chloroaniline); 4,4'-methylene-bis-(2,6-diethylaniline); 4,4'-methylene-bis-(2,3-dichloroaniline); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE® 300, commercially available from Albermarle Corporation of Baton Rouge, La.

Suitable polyamine curatives, which include both primary and secondary amines, preferably have molecular weights ranging from about 64 to about 2000. At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In one embodiment of the present invention, saturated polyurethanes are used to form one or more of the cover layers, preferably the outer cover layer, selected from castable thermoset polyurethanes. In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, that a catalyst may be employed to promote the reaction between the curing agent and the isocyanate and polyol, or the curing agent and the prepolymer.

Saturated diisocyanates which can be used include, without limitation, ethylene diisocyanate; propylene-1,2-diisocyanate; tetramethylene-1,4-diisocyanate; 1,6-hexamethylene-diisocyanate (HDI); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate; methyl cyclohexylene diisocyanate; triisocyanate of HDI; triisocyanate of 2,2,4-trimethyl-1,6-hexane diisocyanate. The most preferred saturated diisocyanates are 4,4'-dicyclohexylmethane diisocyanate and isophorone diisocyanate.

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino) cyclohexane; 1,4-bis-(sec-butylamino) cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Alternatively, other suitable polymers include partially or fully neutralized ionomer, metallocene, or other single-site catalyzed polymer, polyester, polyamide, non-ionomeric thermoplastic elastomer, copolyether-esters, copolyether-amides, polycarbonate, polybutadiene, polyisoprene, polystryrene block copolymers (such as styrene-butadiene-styrene), styrene-ethylene-propylene-styrene, styrene-ethylene-butylene-styrene, and the like, and blends thereof. Thermosetting polyurethanes or polyureas or hybrids thereof are suitable for the outer cover layers of the golf balls of the present invention.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

Thermosetting polyurethane compositions can be replaced with or blended with polyurea materials, which are distinctly different from polyurethane compositions. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof. Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as JEFFAMINE® D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate; 3,3'-dimethyl-4,4'-biphenylene diisocyanate; toluene diisocyanate; polymeric MDI; carbodiimide-modified liquid 4,4'-diphenylmethane diisocyanate; para-phenylene diisocyanate; meta-phenylene diisocyanate; triphenyl methane-4,4'- and triphenyl methane-4,4'-triisocyanate; naphthylene-1,5-diisocyanate; 2,4'-, 4,4'-, and 2,2-biphenyl diisocyanate; polyphenyl polymethylene polyisocyanate; mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate; 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate; triisocyanate of HDI; triisocyanate of 2,2,4-trimethyl-1,6-hexane diisocyanate; 4,4'-dicyclohexylmethane diisocyanate; 2,4-hexahydrotoluene diisocyanate; 2,6-hexahydrotoluene diisocyanate; and mixtures thereof. Aromatic aliphatic isocyanates may also be used to form light stable materials.

Examples of such isocyanates include 1,2-, 1,3-, and 1,4-xylene diisocyanate; meta-tetramethylxylene diisocyanate; para-tetramethylxylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5;dimethylthio-2,4-toluenediamine; 3,5-dimethylthio-2,6-toluenediamine; 3,5-diethylthio-2,4-toluenediamine; 3,5;diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl) ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl) ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

It is envisioned that golf balls of the invention may also incorporate conventional coating layer(s) for the purposes usually incorporated. For example, one or more coating layer may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

Alternative embodiments are envisioned wherein the core may be constructed as follows:

(1) A unitary core having an outer surface, a geometric center, and a soft transition region adjacent to the outer surface. The unitary core is formed from a substantially homogenous rubber composition. The soft transition region has a thickness of up to 4 mm and includes about 8 to 20 percent trans-polybutadiene isomer. The soft transition region also has a negative hardness gradient of up to 15 Shore C. The unitary core has an overall negative hardness gradient of up to 20 Shore C and has a gradient quotient, GQ, defined by the equation:

$$\frac{G+T}{10 \times COR} \leq 7$$

where G is the overall negative hardness gradient in Shore C, T is the percent of trans-polybutadiene isomer at the core outer surface, and COR is the coefficient of restitution measured at an incoming velocity of 125 ft/s.

The transition region may include about 9 to about 15 percent trans-polybutadiene isomer. The core geometric center includes about 5 to 15 percent trans-polybutadiene isomer. The core outer surface includes about 10 to 30 percent trans-polybutadiene isomer. Preferably, the core has a COR of about 0.800 or greater, more preferably about 0.810 or greater, or even 0.813 or greater, which is unusual for a core having such a soft outer portion and comparable compression.

In one embodiment, the gradient quotient, GQ, is about 6 or less, more preferably about 5 or less. The golf ball may include an outer core layer disposed about the unitary core. In another embodiment, the outer core layer has a negative hardness gradient. The negative hardness gradient of the outer core layer is generally about 1 to about 5 Shore C or, alternatively, the negative hardness gradient is about 6 to about 20 Shore C. The outer core layer may also have a positive hardness gradient. Preferably the positive hardness gradient is about 1 to about 5 Shore C or, alternatively, about 6 to about 20 Shore C.

(2) A core having an outer surface having a trans-polybutadiene isomer content of about 30 percent to about 50 percent, a geometric center having a trans-polybutadiene isomer content of about 10 percent to about 35 percent, and a soft transition region adjacent to the outer surface, the soft transition region having a thickness of about 4 mm or less and comprising about 10 to 45 percent of a trans-polybutadiene isomer. The core has an outer surface hardness greater than a hardness at the geometric center to define a positive hardness gradient of about 16 Shore C to 68 Shore C. The core also has a secondary gradient quotient, GQ', of about 3.75 to 12.75, GQ' being defined by the equation:

$$\frac{G'+T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s.

(3) A unitary core having an outer surface, a geometric center, and a soft transition region adjacent to the outer surface. The unitary core is formed from a substantially homogenous rubber composition. The soft transition region has a thickness of up to 4 mm and includes about 8 to 20 percent trans-polybutadiene isomer. The soft transition region also has a negative hardness gradient of up to 15 Shore C. The unitary core has an overall negative hardness gradient of up to 20 Shore C and has a gradient quotient, GQ, defined by the equation:

$$\frac{G+T}{10 \times COR} \leq 7$$

where G is the overall negative hardness gradient in Shore C, T is the percent of trans-polybutadiene isomer at the core outer surface, and COR is the coefficient of restitution measured at an incoming velocity of 125 ft/s.

The transition region may include about 9 to about 15 percent trans-polybutadiene isomer. The core geometric center includes about 5 to 15 percent trans-polybutadiene isomer. The core outer surface includes about 10 to 30 percent trans-polybutadiene isomer. Preferably, the core has a COR of about 0.800 or greater, more preferably about 0.810 or greater, or even 0.813 or greater, which is unusual for a core having such a soft outer portion and comparable compression.

In one embodiment, the gradient quotient, GQ, is about 6 or less, more preferably about 5 or less. The golf ball may include an outer core layer disposed about the unitary core. In another embodiment, the outer core layer has a negative hardness gradient. The negative hardness gradient of the outer core layer is generally about 1 to about 5 Shore C or, alternatively, the negative hardness gradient is about 6 to about 20 Shore C. The outer core layer may also have a positive hardness gradient. Preferably the positive hardness gradient is about 1 to about 5 Shore C or, alternatively, about 6 to about 20 Shore C.

(4) A core having an outer surface, a geometric center, and a soft transition region located adjacent to the outer surface. The soft transition region typically has a thickness of about 4 mm or less. The soft transition region includes about 10 to 30 percent of a trans-polybutadiene isomer. In one embodiment, the soft transition region includes about 10 to 20 percent of a trans-polybutadiene isomer. In another embodiment, the soft transition region includes about 20 to 30 percent of a trans-polybutadiene isomer. The soft transition region includes about 10 to 30 percent of a trans-polybutadiene isomer also has a positive hardness gradient of about 10 Shore C or less.

The solid core preferably has an outer surface hardness greater than the hardness at the geometric center to define a positive hardness gradient (differing from the hardness gradient of the soft transition region) of about 10 Shore C to 42 Shore C. Preferably, the core has a positive hardness gradient of about 12 Shore C to 35 Shore C, more preferably about 13 Shore C to 24 Shore C, and most preferably about 14 Shore C to 21 Shore C.

The core has a secondary gradient quotient (GQ') that ranges from about 2.2 to 9.5. The secondary gradient quotient, GQ', is defined by the equation:

$$\frac{G' + T}{10 \times COR}$$

where G' is the positive hardness gradient of the solid core in Shore C; T is the percent of trans-polybutadiene isomer at the core outer surface, and COR is the coefficient of restitution of the core measured at an incoming velocity of 125 ft/s. In another embodiment, the core has a secondary gradient quotient (GQ') that ranges from about 7.5 to 9.5. Accordingly, the core typically has a coefficient of restitution measured at an incoming velocity of 125 ft/s of about 0.800 or greater, preferably about 0.810 or greater.

The secondary gradient quotient, GQ', is preferably about 2.5 to 8.5, more preferably the secondary gradient quotient, GQ', is about 2.7 to 6.9, and most preferably the secondary gradient quotient, GQ', is about 2.9 to 6.5. The second positive hardness gradient is preferably about 12 Shore C to about 35 Shore C, more preferably the second positive hardness gradient is about 13 Shore C to about 24 Shore C, and most preferably the second positive hardness gradient is about 14 Shore C to about 21 Shore C.

(5) A core having an outer surface, a geometric center, and a soft transition region adjacent to the outer surface. The soft transition region has a thickness of about 4 mm or less and includes about 2 to 10 percent of a trans-polybutadiene isomer. The core outer surface hardness is greater than the hardness at the geometric center to define a positive hardness gradient of about 10 to 48 Shore C. The core has a secondary gradient quotient, GQ', of 1.5 to 7.25, GQ' being defined by the equation:

$$\frac{G' + T}{10 \times COR}$$

where G' is the positive hardness gradient in Shore C, T is the percent trans-polybutadiene isomer at the core outer surface, and COR is the coefficient of restitution of the core measured at an incoming velocity of 125 ft/s.

The positive hardness gradient is preferably about 12 Shore C to 45 Shore C, more preferably about 14 Shore C to 34 Shore C, most preferably about 16 Shore C to 31 Shore C. The core preferably has a COR of about 0.800 or greater, more preferably about 0.810 or greater. The secondary gradient quotient, GQ', is preferably about 2.5 to about 6.25, more preferably about 3 to about 5.

In a preferred embodiment, the soft transition region comprises about 2 percent to about 8 percent of a trans-polybutadiene isomer. The geometric center of the core includes about 1 percent to about 10 percent trans-polybutadiene isomer and the surface of the core includes about 2 percent to about 10 percent trans-polybutadiene isomer.

(6) A core having an outer surface having a trans-polybutadiene isomer content of about 2 percent to about 10 percent, a geometric center having a trans-polybutadiene isomer content of about 1 percent to about 10 percent, and a soft transition region adjacent to the outer surface, the soft transition region having a thickness of about 4 mm or less and comprising about 2 to 10 percent of a trans-polybutadiene isomer.

The core has an outer surface hardness greater than a hardness at the geometric center to define a positive hardness gradient of about 14 Shore C to 34 Shore C. The core also has a secondary gradient quotient, GQ', of about 2.5 to 6.25, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s.

(7) A single core having an outer surface and a geometric center, and is formed from a substantially homogenous rubber composition. The outer surface of the core has a trans content of about 12% or less and a hardness of about 71 to 88 Shore C, the geometric center has a trans content of about 10% or less and a hardness of about 70 to 80 Shore C, and the core surface hardness is greater than the geometric center hardness by about 1 to 10 Shore C to define a shallow positive hardness gradient.

In one embodiment, the positive hardness gradient is about 2 to 8 Shore C, more preferably about 2.5 to 7 Shore C. The core preferably has an outer diameter of about 1.45 to about 1.62 inches, more preferably about 1.50 to about 1.58 inches. The hardness of the geometric center of the core is generally about 72 to 78 Shore C and the hardness of the core surface is generally about 73 to 80 Shore C, more preferably about 74 to 78 Shore C. In another preferred embodiment, the outer surface of the core has a trans content of about 10% or less and the geometric center of the core has a trans content of about 8% or less.

(8) A single core having an outer diameter of about 1.5 to 1.55 inches. The core is typically formed from a substantially homogenous rubber composition. The outer surface of the core has a trans content of about 12% or less and a hardness of about 74 to 78 Shore C, the geometric center has a trans content of about 10% or less and a hardness of about 72 to 78 Shore C, and the core surface hardness is greater than the geometric center hardness by about 1 to 5 Shore C to define a shallow positive hardness gradient, the core having an Atti compression of about 50 to 70.

(9) A single core having an outer diameter of about 1.45 inches, an outer surface, and a geometric center, and being formed from a substantially homogeneous rubber composition. the outer surface of the core has a trans content of about 12% or less and a hardness of about 74 to 78 Shore C, the geometric center has a trans content of about 10% or less and a hardness of about 72 to 78 Shore C, and the core surface hardness is greater than the geometric center hardness by about 1 to 5 Shore C to define a shallow positive hardness gradient.

(10) A core having an outer surface and a geometric center. The core is typically formed from a substantially homogenous rubber composition. The outer surface of the core has a trans-polybutadiene content of about 12% or less and a hardness of about 71 to 88 Shore C. The geometric center of the core has a trans-polybutadiene content of about 10% or less and a hardness of about 60 to 80 Shore C. The core also has an outer surface hardness greater than a geometric center hardness by about 5 to 19 Shore C to define a positive hardness gradient.

Preferably, the positive hardness gradient is about 10 to 19 Shore C, more preferably about 12 to 19 Shore C, most preferably about 14 to 17 Shore C. The core has an outer diameter of about 1.45 to 1.62 inches, more preferably about 1.50 to about 1.58 inches. The hardness of the geometric center of the core is preferably about 60 to 70 Shore C and the hardness of the surface of the core is preferably about 74 to 85 Shore C. More preferably, the core surface hardness is about 80 to 84 Shore C. Alternatively, the core surface hardness is about 75 to 79 Shore C. In one embodiment, the outer surface has a trans-polybutadiene content of about 10% or less and the geometric center has a trans-polybutadiene content of about 8% or less.

(11) A core having an outer surface and a geometric center and is formed from a substantially homogenous rubber composition. The outer surface of the core has a trans-polybutadiene content of about 12% or less and a hardness of about 45 to 56 Shore D. The geometric center of the core has a trans-polybutadiene content of about 10% or less and a hardness of about 35 to 45 Shore D. The core outer surface hardness is greater than the core geometric center hardness by about 3 to 15 Shore D to define a positive hardness gradient.

The geometric center preferably has a hardness of about 38 to 43 Shore D and the outer surface hardness is preferably about 48 to 54 Shore D. The positive hardness gradient is preferably about 5 to 13 Shore D, more preferably about 7 to 11 Shore D.

(12) A core having an outer surface and a geometric center, the outer surface of the core preferably has a hardness of about 68 Shore C to about 92 Shore C, more preferably the outer surface of the core has a hardness of about 74 Shore C to about 85 Shore C, and most preferably outer surface of the core preferably has a hardness of about 80 Shore C to about 84 Shore C. In an alternative embodiment, the outer surface of the core has a hardness of about 45 Shore D to about 56 Shore D, preferably the outer surface of the core has a hardness of about 48 Shore D to about 54 Shore D.

The geometric center of the core may have a hardness of about 45 Shore C to about 85 Shore C. Preferably, the geometric center of the core has a hardness of about 60 Shore C to about 85 Shore C, more preferably the geometric center of the core has a hardness of about 62 Shore C to about 80 Shore C, and most preferably the geometric center of the core has a hardness of about 65 Shore C to about 72 Shore C. In an alternative embodiment, the geometric center of the core has a hardness of about 35 Shore D to about 45 Shore D, preferably the geometric center of the core has a hardness of about 38 Shore D to about 43 Shore D.

While the core outer surface hardness may be greater than the geometric center hardness by about 5 Shore C to about 55 Shore C to define a positive hardness gradient, preferably the core outer surface hardness is greater than the geometric center hardness by about 5 Shore C to about 21 Shore C, more preferably the core outer surface hardness is greater than the geometric center hardness by about 11 Shore C to about 19 Shore C, and most preferably the core outer surface hardness is greater than the geometric center hardness by about 13 Shore C to about 18 Shore C. In an alternative embodiment, the outer surface of the core has a hardness that is greater than the hardness at the geometric center of the core by about 3 Shore D to about 15 Shore D to define a positive hardness gradient. More preferably, the positive hardness gradient is about 5 Shore D to about 13 Shore D, and most preferably, the positive hardness gradient is about 7 Shore D to about 11 Shore D.

The outer surface of the core preferably has a trans content of about 12% or less and the geometric center of the core preferably has a trans content of about 10% or less. In one alternative embodiment, the core has an outer diameter of about 1.45 to about 1.62 inches.

Golf balls of the present invention may include a single-layer (one-piece) golf ball, and multi-layer golf balls, such as one having a core and a cover surrounding the core, but are preferably formed from a core comprised of a solid center (otherwise known as an inner core) and an outer core layer, an inner cover layer and an outer cover layer. Of course, any of the core and/or the cover layers may include more than one layer. In a preferred embodiment, the core is formed of an inner core and an outer core layer where both the inner core and the outer core layer have a "soft-to-hard" hardness gradient (a "negative" hardness gradient) radially inward from each component's outer surface towards its innermost portion (i.e., the center of the inner core or the inner surface of the outer core layer), although alternative embodiments involving varying direction and combination of hardness gradient amongst core components are also envisioned (e.g., a "negative" gradient in the center coupled with a "positive" gradient in the outer core layer, or vice versa).

The center of the core may also be a liquid-filled or hollow sphere surrounded by one or more intermediate and/or cover layers, or it may include a solid or liquid center around which tensioned elastomeric material is wound. Any layers disposed around these alternative centers may exhibit the inventive core hardness gradient (i.e., "negative"). The cover layer may be a single layer or, for example, formed of a plurality of layers, such as an inner cover layer and an outer cover layer.

One preferred golf ball construction includes a solid core, an inner cover layer, and an outer cover layer. The core has an outer surface and a geometric center, both of which have hardness values. The core is typically formed from a substantially homogenous rubber composition, such as a polybutadiene rubber. The inner cover layer is preferably formed from an ionomeric material and has a material hardness of about 60 Shore D or greater. The outer cover layer, formed over the inner cover layer, is preferably a polyurea or a polyurethane material and has a material hardness of about 60 Shore D or less, wherein the outer surface is treated with a thermoset polyurethane and/or polyurea microhardness-increasing solution consisting of an isocyanate portion and at least one non-aqueous solvent such that a treated comprises the isocyanate portion and is harder than an untreated region that does not contain the isocyanate portion. The outer surface of the core preferably has a trans-polybutadiene content of about 12% or less, more preferably 10% or less, and most preferably about 8% or less. The core outer surface hardness is preferably about 71 to 88 Shore C. The geometric center of the core has a trans-polybutadiene content of about 10% or less and a hardness of about 60 to 80 Shore C. The core also has an outer surface hardness greater than a geometric center hardness by about 5 to 19 Shore C to define a positive hardness gradient.

Preferably, the positive hardness gradient is about 10 to 19 Shore C, more preferably about 12 to 19 Shore C, most preferably about 14 to 17 Shore C. The hardness of the geometric center of the core is preferably about 60 to 70 Shore C and the hardness of the surface of the core is preferably about 74 to 85 Shore C. More preferably, the core surface hardness is about 80 to 84 Shore C. Alternatively, the core surface hardness is about 75 to 79 Shore C. In one embodiment, the outer surface has a trans-polybutadiene content of about 10% or less and the geometric center has a trans-polybutadiene content of about 8% or less.

The present invention is directed to a golf ball including a core, an inner cover layer, and an outer cover layer. The core has an outer surface and a geometric center and is formed from a substantially homogenous rubber composition. The inner cover layer is formed from an ionomeric material and has a material hardness of about 60 Shore D or greater. The outer cover layer includes a polyurethane and/or a polyurea and has a material hardness of about 60 Shore D or less, wherein the outer surface is treated with a thermoset polyurethane and/or polyurea microhardness-increasing solution consisting of an isocyanate portion and at least one non-aqueous solvent such that a treated comprises the isocyanate portion and is harder than an untreated region that does not contain the isocyanate portion. Preferably, the outer surface of the core has a trans-polybutadiene content of about 12% or less and a hardness of about 45 to 56 Shore D. The geometric center of the core has a trans-polybutadiene content of about 10% or less and a hardness of about 35 to 45 Shore D. The core outer surface hardness is greater than the core geometric center hardness by about 3 to 15 Shore D to define a positive hardness gradient.

The geometric center preferably has a hardness of about 38 to 43 Shore D and the outer surface hardness is preferably about 48 to 54 Shore D. The positive hardness gradient is preferably about 5 to 13 Shore D, more preferably about 7 to 11 Shore D.

As briefly discussed above, the inventive cores may have a hardness gradient defined by hardness measurements made at the surface of the inner core (or outer core layer) and radially inward towards the center of the inner core, typically at 2-mm increments. As used herein, the terms "negative" and "positive" refer to the result of subtracting the hardness value at the innermost portion of the component being measured (e.g., the center of a solid core or an inner core in a dual core construction; the inner surface of a core layer; etc.) from the hardness value at the outer surface of the component being measured (e.g., the outer surface of a solid core; the outer surface of an inner core in a dual core; the outer surface of an outer core layer in a dual core, etc.). For example, if the outer surface of a solid core has a lower hardness value than the center (i.e., the surface is softer than the center), the hardness gradient will be deemed a "negative" gradient (a smaller number–a larger number=a negative number). It is preferred that the inventive cores have a zero or a negative hardness gradient, more preferably between zero (0) and −10, most preferably between 0 and −5.

The invention is more particularly directed to the creation of a soft "skin" (or transition volume) on the outermost surface of the core, such as the outer surface of a single core or the outer surface of the outer core layer in a dual core construction. The skin or transition volume is not a separate layer, but is a portion of the unitary core having differing hardness properties from the rest of the core, all of which are formed from the same composition.

The "skin" is typically defined as the volume of the core that is within about 0.001 inches to about 0.100 inches of the surface, and more preferably about 0.010 inches to about 0.030 inches. In the most preferred embodiment, a single or multi-layer core is treated as a perform (prior to molding) by coating the surface of the perform with a cure-altering material. The cure-altering material may be in a solid form, typically a powder, prill, or small pellet, but alternatively may be in solution form, such as a liquid, dispersion, or slurry in a solvent. Suitable solvents include, but are not limited to, water, hydrocarbon solvents, polar solvents, and plasticizers. If a liquid is used, it is preferably water. In the most preferred embodiment, a free-flowing, relatively small particle-size powder is used to uniformly coat the perform. Preferably the layer is a core or core layer, but also in an alternative embodiment a cover or cover layer (inner or outer cover layer) comprising a diene rubber composition, preferably polybutadiene rubber.

Cure-altering materials for treatment include, but are not limited to, antioxidants, sulfur-bearing compounds such as pentachlorothiophenol or metal salts thereof, ZDMA, softening acrylate monomers or oligomers, and soft powdered thermoplastic resins such as ethyl vinyl acetate, ethylene butyl acrylate, ethylene methyl acrylate, and very-low-modulus ionomers. Preferred cure-altering materials are phenol-comprising antioxidants, hydroquinones, and "soft and fast" agents, such as organosulfur compounds, inorganic sulfur compounds, and thiophenols, particularly pentachlorothiophenol (PCTP) and metal salts of PCTP, such as ZnPCTP, MgPCTP, DTDS, and those disclosed in U.S. Pat. Nos. 6,458,895; 6,417,278; and 6,635,716; and U.S. Patent Application Publication Serial No. 2006/021586, the disclosure of which are incorporated herein by reference. Alternatively, thermoplastic or thermosetting powders, such as low molecular weight polyethylene, ethyl vinyl acetate, ethylene copolymers and terpolymers (i.e., NUCREL®), ethylene butyl acrylate, ethylene methyl acrylate, polyurethanes, polyureas, polyurethane-copolymers (i.e., silicone-urethanes), PEBAX®, HYTREL®, polyesters, polyamides, epoxies, silicones, and Micromorph® materials, such as those disclosed in U.S. patent application Publication Ser. Nos. 11/690,530 and 11/690,391, incorporated herein by reference.

In one particularly preferred embodiment, a polybutadiene rubber preform is coated with an antioxidant-comprising powder and then molded at 350-360° F. for 11 minutes to form a single core. The resultant core has an outer diameter of about 1.580 inches and a geometric center point hardness of about 60 Shore C to about 80 Shore C, preferably about 65 Shore C to about 78 Shore C, and most preferably about 70 Shore C to about 75 Shore C. The hardness at a distance of about 8 mm from the center point is about 75 Shore C to about 77 Shore C; at 14 mm from the center point about 73 Shore C to about 75 Shore C, at 18 mm from the center point about 80 Shore C; at 25 mm from the center point about 85 Shore C; and at 30 mm from the center point about 90 Shore C. At a point about 31 mm to about 40 mm from the center point of the core, the soft "skin" has a hardness of about 60 Shore C to about 80 Shore C, preferably 65 Shore C to about 75 Shore C, and most preferably about 68 Shore C to about 74 Shore C, resulting in an overall gradient (as measured from center to surface) of zero, and most preferably negative (i.e., about −30 to 0, more preferably about −15 to 0, most preferably about −10 to 0). The core of this example typically has an Atti compression of about 70 and a COR of about 0.800, when measured at an incoming velocity of 125 ft/s. Preferred Atti core compressions are 110 of less, preferably 100 or less, more preferably 90 or less, and most preferably 80 or less.

A second particularly preferred embodiment is a two-piece core formed from an inner core and an outer core layer. The inner core may or may not be "treated" as described herein, but preferably the outer core layer is treated to create the soft outer "skin." In one embodiment, a soft inner core is surrounded by a relatively hard outer core layer. The inner core preferably has a an outer diameter of about 1.0 inch, a center point hardness of about 55 Shore C to about 60 Shore C, and an outer surface hardness of about 75 Shore C to about 80 Shore C. The surface hardness of the modified "skin" of the outer core layer is about 60 Shore C to about 80 Shore C, more preferably about 65 Shore C to about 75 Shore C, and most preferably about 68 Shore C to about 74 Shore C. A preferred overall gradient is negative to zero, most preferably negative (i.e., about −30 to 0, more preferably about −15 to 0, most preferably about −10 to 0).

Referring to FIG. 1, in one embodiment of the present invention the golf ball 10 includes a low compression core 12, having a geometric center 14 and a surface 16, and a cover layer 18. Geometric center 14 has a hardness that is less than the hardness at the core surface 16 so as to define a "positive hardness gradient" across the core. Core 12 also includes a transition volume 20. Cover 18 has a treated region having microhardness $M_1$ and an untreated region having microhardness $M_2$, wherein $M_1$ is greater than $M_2$.

Figure 2:
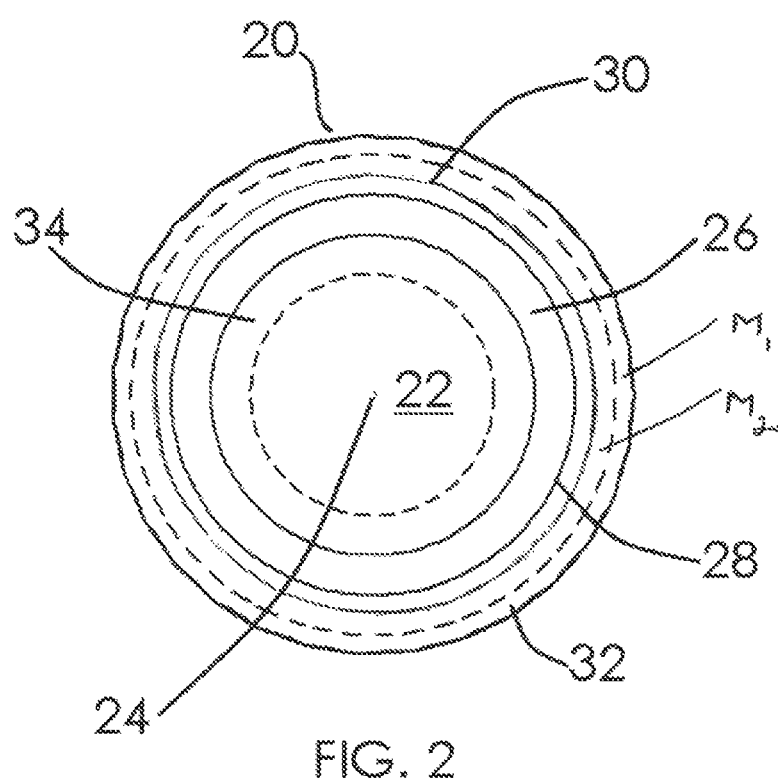
FIG. 2 is a representative cross section of a golf ball of the invention.

Referring to FIG. 2, in one embodiment of the present invention the golf ball 20 includes a low compression core 22, having a geometric center 24, an outer core layer 26, a core surface 28, an inner cover layer 30, and an outer cover layer 32. Core 22 includes a transition volume 34. Outer cover layer 32 has a treated region having microhardness $M_1$ and an untreated region having microhardness $M_2$, wherein $M_1$ is greater than $M_2$.

Advantageously, each of the core geometric center hardness and core outer surface hardness may be coordinated with each of outer cover layer microhardnesses $M_1$ and $M_2$ to target unique playing characteristics without adding an additional cover layer which not only reduces golf ball manufacturing costs but also eliminates any possible adhesion problems which can arise between adjacent layers when separate layers are used to create a first layer having a microhardness $M_1$ and a second layer having a microhardness $M_2$.

Another preferred embodiment is a golf ball comprising a unitary core having a volume, an outer surface, a geometric center, and an outermost transition volume adjacent to the outer surface, the core being formed from a substantially homogenous composition; and a cover layer; wherein the outermost transition volume is disposed between the core outer surface and the geometric center, the transition volume has an outer portion congruent with the core outer surface, and comprises the outermost 45% of the core volume or less; and wherein both a hardness of the core outer surface and a hardness within the outermost transition volume are less than the hardness of the geometric center to define a negative hardness gradient.

The transition volume comprises the outermost 5% to 40% of the core volume, more preferably the outermost 10% to 30% of the core volume, and most preferably the outermost 10% to 20% of the core volume. The transition volume typically has a thickness of 0.65 mm to 2.5 mm, preferably 0.75 mm to 1.9 mm, and more preferably 1 mm to 1.5 mm.

The hardness of the core outer surface is 1 Shore C to 10 Shore C greater than the hardness at the geometric center, more preferably 1 Shore C to 5 Shore C greater than the hardness at the geometric center.

Meanwhile however, as can be seen in Table 1 below, the transition volume has an inner portion and the hardness within the transition volume is decreased by at least 2 Shore C/mm, more preferably by at least 3 Shore C/mm, and most preferably by at least 4 Shore C/mm, in a direction away from the inner portion and towards the outer portion. At least one cover layer is formed from a thermoset polyurethane, a thermoset polyurea, a thermoset polyurethane-urea, or a thermoset polyurea-urethane wherein either the outer surface or inner surface of the layer is contacted (or otherwise treated) with a thermoset polyurethane microhardness-increasing solution consisting of an isocyanate portion and at least one non-aqueous solvent. Once again, the treated region comprises the isocyanate portion and has a microhardness $M_1$ that is greater than a microhardness $M_2$ of the untreated region, whereas the untreated region is not contacted with the thermoset polyurethane microhardness-increasing solution and does not comprise the isocyanate portion.

TABLE 1

| | Distance from Center of Core (mm)[1] | Control | Treated Core |
|---|---|---|---|
| Geometric Center | 0 | 58 | 61.2 |
| | 2 | 64.8 | 65.3 |
| | 4 | 69.6 | 68.1 |
| | 6 | 71.3 | 70.7 |
| | 8 | 71.9 | 71 |
| | 10 | 71.9 | 71 |
| | 12 | 73.1 | 72.3 |
| | 14 | 77.2 | 76.1 |
| | 16 | 81.3 | 80.3 |

TABLE 1-continued

| | Distance from Center of Core (mm)[1] | Control | Treated Core |
|---|---|---|---|
| Surface | 19.4 | 80.8 | 66.2 |
| Compression | | 73 | 67 |
| COR @ 125 ft/s | | 0.790 | 0.780 |

[1]for a core having an outer diameter of 1.57 inches

An alternative embodiment is a golf ball comprising a unitary core having a volume, an outer surface, a geometric center, and an outermost transition volume adjacent to the outer surface, the core being formed from a substantially homogenous composition; a treated thermoset cover layer as defined herein; and an intermediate layer disposed between the unitary core and the cover layer; wherein the outermost transition volume is disposed between the core outer surface and the geometric center, the transition volume has an outer portion congruent with the core outer surface, and comprises the outermost 45% of the core volume or less; and wherein both a hardness of the core outer surface and a hardness within the outermost transition volume are less than the hardness of the geometric center to define a negative hardness gradient. The intermediate layer may be formed from an ionomeric material. The treated cover layer is formed from a thermoset polyurethane, a polyurea, or a hybrid thereof.

A dual core embodiment includes a golf ball comprising a unitary inner core having a volume, an outer surface, a geometric center, and an outermost transition volume adjacent to the outer surface, the core being formed from a substantially homogenous composition; an outer core layer disposed about the unitary inner core and having a negative hardness gradient or a positive hardness gradient; an inner cover layer; and a treated thermoset polyurethane, a polyurea, or a hybrid thereof outer cover layer as defined herein; wherein the outermost transition volume is disposed between the inner core outer surface and the geometric center, the transition volume has an outer portion congruent with the inner core outer surface, and comprises the outermost 45% of the inner core volume or less; and wherein both a hardness of the inner core outer surface and a hardness within the outermost transition volume are less than the hardness of the geometric center to define a negative hardness gradient. Preferably, the inner cover layer is formed from an ionomeric material.

The core formulations used in the invention are preferably based upon high-cis polybutadiene rubber that is cobalt-, nickel-, lithium-, or neodymium-catalyzed, most preferably Co- or Nd-catalyzed, having a Mooney viscosity of about 25 to about 125, more preferably about 30 to about 100, and most preferably about 40 to about 60. Lesser amounts of non-polybutadiene rubber, such as styrene butadiene rubber, trans-polyisoprene, natural rubber, butyl rubber, ethylene propylene rubber, ethylene propylene diene monomer rubber, low-cis polybutadiene rubber, or trans polybutadiene rubber, may also be blended with the polybutadiene rubber. A coagent, such as zinc diacrylate or zinc dimethacrylate, is typically present at a level of about 0 pph to about 60 pph, more preferably about 10 pph to about 55 pph, and most preferably about 15 pph to about 40 pph. A peroxide or peroxide blend is also typically present at about 0.1 pph to about 5.0 pph, more preferably about 0.5 pph to about 3.0 pph. Zinc oxide may also be present at about 5 pph to about 50 pph and the antioxidant is preferably present at about 0 pph to about 0.1 pph to about 5.0 pph, preferably about 0.5 pph to about 3.0 pph.

Other embodiments include any number of core layers and gradient combinations wherein at least one layer of the core has a surface that is "treated" as described herein. Scrap automotive tire regrind (in fine powder form) is also sufficient for creating the inventive soft outer "skin," as well as other powdered rubbers that are uncrosslinked or partially crosslinked and therefore able to react with the polybutadiene. Fully crosslinked powdered rubber may also still have enough affinity for the polybutadiene substrate to adhere (even react minimally) enough to form a good bond.

Other potential surface-softening or cure-altering agents include, but are not limited to, sulfated fats, sodium salts of aklylated aromatic sulfonic acids, substituted benzoid alkyl sulfonic acids, monoaryl and alkyl ethers of diethylene glycol and dipropylene glycol, ammonium salts of alkyl phosphates, sodium alkyl sulfates and monosodium salt of sulfated methyl oleate and sodium salts of carboxylated eletrolytes. Other suitable materials include dithiocarbamates, such as zinc dimethyl dithiocarbamate, zinc diethyl dithiocarbamate, zinc di-n-butyl dithiocarbamate, zinc diamyl dithiocarbamate, tellurium diethyl dithiocarbamate, selenium dimethyl dithiocarbamate, selenium diethyl dithiocarbamate, lead diamyl dithiocarbamate, bismuth dimethyl dithiocarbamate, cadmium diethyl dithiocarbamate, and mixtures thereof.

The method for making the golf ball of the invention includes a variety of steps and options. Typically, a Banbury-type mixer or the like is used to mix the polybutadiene rubber composition. The rubber composition is extruded as an extrudate and cut to a predetermined shape, such as a cylinder, typically called a "preform". The preform comprising the uncured polybutadiene composition is then prepared for coating with at least one of the cure-altering (inhibiting) materials, liquids, or solvents described above. Preferred cure-altering materials include wherein the cure-altering material comprises antioxidants, sulfur-bearing compounds, zinc methacrylate, zinc dimethacrylate, softening acrylate monomers or oligomers, soft powdered thermoplastic resins, phenol-comprising antioxidants, or hydroquinones, most preferably an antioxidant.

In one embodiment, more than one cure-altering material is used, in succession. In this embodiment, a preferred combination includes a first cure-altering material such as an antioxidant and a second cure-altering material such as a different antioxidant or a peroxide. A compatiblilizer and/or tie layer may be incorporated. Additionally, a two-stage dip or roll (in the cure-altering material) may be used to sequentially provide a first and second antioxidant or an antioxidant and a peroxide.

Optionally, prior to coating the preform, the uncured preform may be shaped or cold-formed into a rough sphere. The coating may be performed in a variety of manners including, but not limited to, rolling, spraying, dipping, or dusting. The coating may be uniform or varied, but is preferably uniform.

The uncured, coated preform may optionally be heated to a predetermined temperature for a predetermined time, the temperature being substantially below the predetermined cure temperature, so that the cure-altering material may diffuse, penetrate, migrate, or otherwise work its way into the preform or, alternatively, any solvent may evaporate or the preform may dry (if the coating was in liquid form). If two cure-altering materials are employed, this time is also preferred to allow any reaction that may occur to come to completion.

The uncured coated preform is then cured or molded at a predetermined temperature and time to form a crosslinked golf ball core. As described in detail above, the core has an outer surface having a first hardness and a geometric center having a second hardness greater than the first to define a "negative" hardness gradient. Any one of a number of cover layers may be formed around the "negative" gradient core including, but not limited to, an outer core layer, an inner cover layer, and an outer cover layer.

The cured core is then typically centerless-grinded so that the core is uniformly spherical and has a surface than is roughened and textured to be better suited for adhesion with subsequent layers. Prior to of after the centerless grinding the core may be treated with plasma discharge, corona discharge, silanes, or chlorination, for example, to aid in its adhesion properties.

A particularly preferred method includes the steps of extruding a polybutadiene composition the form a cylindrical extrudate; cutting the extrudate to form an uncured polybutadiene preform; uniformly coating the preform with a cure-altering material comprising a first antioxidant; curing the coated preform to form a crosslinked core having an outer surface having a first hardness and a geometric center having a second hardness greater than the first to define a negative hardness gradient; centerless-grinding the cured core to form a uniformly-spherical core having increased surface roughness; forming an inner cover layer about the uniformly-spherical core; and forming an outer cover layer about the inner cover layer to form the golf ball.

Preferably, the core layers (inner core or outer core layer) is made from a composition including at least one thermoset base rubber, such as a polybutadiene rubber, cured with at least one peroxide and at least one reactive co-agent, which can be a metal salt of an unsaturated carboxylic acid, such as acrylic acid or methacrylic acid, a non-metallic coagent, or mixtures thereof. Preferably, a suitable antioxidant is included in the composition. An optional soft and fast agent (and sometimes a cis-to-trans catalyst), such as an organosulfur or metal-containing organosulfur compound, can also be included in the core formulation Other ingredients that are known to those skilled in the art may be used, and are understood to include, but not be limited to, density-adjusting fillers, process aides, plasticizers, blowing or foaming agents, sulfur accelerators, and/or non-peroxide radical sources. The base thermoset rubber, which can be blended with other rubbers and polymers, typically includes a natural or synthetic rubber. A preferred base rubber is 1,4-polybutadiene having a cis structure of at least 40%, preferably greater than 80%, and more preferably greater than 90%.

Examples of desirable polybutadiene rubbers include BUNA® CB22 and BUNA® CB23, commercially available from LANXESS Corporation; UBEPOL® 360L and UBEPOL® 150L and UBEPOL-BR rubbers, commercially available from UBE Industries, Ltd. of Tokyo, Japan; KINEX® 7245 and KINEX® 7265, commercially available from Goodyear of Akron, Ohio; SE BR-1220, and TAKTENE® 1203G1, 220, and 221, commercially available from Dow Chemical Company; Europrene® NEOCIS® BR 40 and BR 60, commercially available from Polimeri Europa; and BR 01, BR 730, BR 735, BR 11, and BR 51, commercially available from Japan Synthetic Rubber Co., Ltd; PETROFLEX® BRNd-40; and KARBOCHEM® ND40, ND45, and ND60, commercially available from Karbochem.

From the Lanxess Corporation, most preferred are the neodymium and cobalt catalyzed grades, but all of the following may be used: Buna CB 21; Buna CB 22; Buna CB 23; Buna CB 24; Buna CB 25; Buna CB 29 MES; Buna CB Nd 40; Buna CB Nd 40 H; Buna CB Nd 60; Buna CB 55 NF; Buna CB 60; Buna CB 45 B; Buna CB 55 B; Buna CB 55 H; Buna CB 55 L; Buna CB 70 B; Buna CB 1220; Buna CB 1221; Buna CB 1203; Buna CB 45. Additionally, numerous suitable rubbers are available from JSR (Japan Synthetic Rubber), Ubepol sold by Ube Industries Inc, Japan, BST sold by BST Elastomers, Thailand; IPCL sold by Indian Petrochemicals Ltd, India; Nitsu sold by Karbochem or Karbochem Ltd of South Africa; Petroflex of Brazil; LG of Korea; and Kuhmo Petrochemical of Korea.

The base rubber may also comprise high or medium Mooney viscosity rubber, or blends thereof. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

The Mooney viscosity range is preferably greater than about 40, more preferably in the range from about 40 to about 80 and more preferably in the range from about 40 to about 60. Polybutadiene rubber with higher Mooney viscosity may also be used, so long as the viscosity of the polybutadiene does not reach a level where the high viscosity polybutadiene clogs or otherwise adversely interferes with the manufacturing machinery. It is contemplated that polybutadiene with viscosity less than 65 Mooney can be used with the present invention.

In one embodiment of the present invention, golf ball cores made with mid- to high-Mooney viscosity polybutadiene material exhibit increased resiliency (and, therefore, distance) without increasing the hardness of the ball. Such cores are soft, i.e., compression less than about 60 and more specifically in the range of about 50-55. Cores with compression in the range of from about 30 about 50 are also within the range of this preferred embodiment.

Commercial sources of suitable mid- to high-Mooney viscosity polybutadiene include Bayer AG CB23 (Nd-catalyzed), which has a Mooney viscosity of around 50 and is a highly linear polybutadiene, and Shell 1220 (Co-catalyzed). If desired, the polybutadiene can also be mixed with other elastomers known in the art, such as other polybutadiene rubbers, natural rubber, styrene butadiene rubber, and/or isoprene rubber in order to further modify the properties of the core. When a mixture of elastomers is used, the amounts of other constituents in the core composition are typically based on 100 parts by weight of the total elastomer mixture.

In one preferred embodiment, the base rubber comprises a Nd-catalyzed polybutadiene, a rare earth-catalyzed polybutadiene rubber, or blends thereof. If desired, the polybutadiene can also be mixed with other elastomers known in the art such as natural rubber, polyisoprene rubber and/or styrene-butadiene rubber in order to modify the properties of the core. Other suitable base rubbers include thermosetting materials such as, ethylene propylene diene monomer rubber, ethylene propylene rubber, butyl rubber, halobutyl rubber, hydrogenated nitrile butadiene rubber, nitrile rubber, and silicone rubber.

Thermoplastic elastomers (TPE) many also be used to modify the properties of the core layers, or the uncured core layer stock by blending with the base thermoset rubber. These TPEs include natural or synthetic balata, or high trans-polyisoprene, high trans-polybutadiene, or any styrenic block copolymer, such as styrene ethylene butadiene styrene, styrene-isoprene-styrene, etc., a metallocene or other single-site catalyzed polyolefin such as ethylene-octene, or ethylene-butene, or thermoplastic polyurethanes (TPU), including copolymers, e.g. with silicone. Other suitable TPEs for blending with the thermoset rubbers of the present invention include PEBAX®, which is believed to comprise polyether amide copolymers, HYTREL®, which is believed to comprise polyether ester copolymers, thermoplastic urethane, and KRATON®, which is believed to comprise styrenic block copolymers elastomers. Any of the TPEs or TPUs above may also contain functionality suitable for grafting, including maleic acid or maleic anhydride.

Additional polymers may also optionally be incorporated into the base rubber. Examples include, but are not limited to, thermoset elastomers such as core regrind, thermoplastic vulcanizate, copolymeric ionomer, terpolymeric ionomer, polycarbonate, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, styrene-acrylonitrile polymer (SAN) (including olefin-modified SAN and acrylonitrile-styrene-acrylonitrile polymer), styrene-maleic anhydride copolymer, styrenic copolymer, functionalized styrenic copolymer, functionalized styrenic terpolymer, styrenic terpolymer, cellulose polymer, liquid crystal polymer, ethylene-vinyl acetate copolymers, polyurea, and polysiloxane or any metallocene-catalyzed polymers of these species.

Suitable polyamides for use as an additional polymeric material in compositions within the scope of the present invention also include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexanediamine, or m-xylylenediamine; (2) a ring-opening polymerization of cyclic lactam, such as ε-caprolactam or Ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include NYLON 6, NYLON 66, NYLON 610, NYLON 11, NYLON 12, copolymerized NYLON, NYLON MXD6, and NYLON 46.

Suitable peroxide initiating agents include dicumyl peroxide; 2,5-dimethyl-2,5-di(t-butylperoxy) hexane; 2,5-dimethyl-2,5-di(t-butylperoxy)hexyne; 2,5-dimethyl-2,5-di(benzoylperoxy)hexane; 2,2'-bis(t-butylperoxy)-di-isopropylbenzene; 1,1-bis(t-butylperoxy)-3,3,5-trimethyl cyclohexane; n-butyl 4,4-bis(t-butyl-peroxy)valerate; t-butyl perbenzoate; benzoyl peroxide; n-butyl 4,4'-bis(butylperoxy) valerate; di-t-butyl peroxide; or 2,5-di-(t-butylperoxy)-2,5-dimethyl hexane, lauryl peroxide, t-butyl hydroperoxide, α-α bis(t-butylperoxy) diisopropylbenzene, di(2-t-butyl-peroxyisopropyl)benzene, di-t-amyl peroxide, di-t-butyl peroxide. Preferably, the rubber composition includes from about 0.25 to about 5.0 parts by weight peroxide per 100 parts by weight rubber (phr), more preferably 0.5 phr to 3 phr, most preferably 0.5 phr to 1.5 phr. In a most preferred embodiment, the peroxide is present in an amount of about 0.8 phr. These ranges of peroxide are given assuming the peroxide is 100% active, without accounting for any carrier that might be present. Because many commercially available peroxides are sold along with a carrier compound, the actual amount of active peroxide present must be calculated. Commercially-available peroxide initiating agents include DICUP® family of dicumyl peroxides (including DICUP® R, DICUP® 40C and DICUP® 40KE) available from Crompton (Geo Specialty Chemicals). Similar initiating agents are available from AkroChem, Lanxess, Flexsys/Harwick and R.T. Vanderbilt. Another commercially-available and preferred initiating agent is TRIGONOX® 265-50B from Akzo Nobel, which is a mixture of 1,1-di(t-butylperoxy)-3,3,5-trimethylcyclohexane and di(2-t-butylperoxyisopropyl) benzene. TRIGONOX® peroxides are generally sold on a carrier compound.

Suitable reactive co-agents include, but are not limited to, metal salts of diacrylates, dimethacrylates, and monomethacrylates suitable for use in this invention include those wherein the metal is zinc, magnesium, calcium, barium, tin, aluminum, lithium, sodium, potassium, iron, zirconium, and bismuth. Zinc diacrylate (ZDA) is preferred, but the present invention is not limited thereto. ZDA provides golf balls with a high initial velocity. The ZDA can be of various grades of purity. For the purposes of this invention, the lower the quantity of zinc stearate present in the ZDA the higher the ZDA purity. ZDA containing less than about 10% zinc stearate is preferable. More preferable is ZDA containing about 4-8% zinc stearate. Suitable, commercially available zinc diacrylates include those from Sartomer Co. The preferred concentrations of ZDA that can be used are about 10 phr to about 40 phr, more preferably 20 phr to about 35 phr, most preferably 25 phr to about 35 phr. In a particularly preferred embodiment, the reactive co-agent is present in an amount of about 29 phr to about 31 phr.

Additional preferred co-agents that may be used alone or in combination with those mentioned above include, but are not limited to, trimethylolpropane trimethacrylate, trimethylolpropane triacrylate, and the like. It is understood by those skilled in the art, that in the case where these co-agents may be liquids at room temperature, it may be advantageous to disperse these compounds on a suitable carrier to promote ease of incorporation in the rubber mixture.

Antioxidants are compounds that inhibit or prevent the oxidative breakdown of elastomers, and/or inhibit or prevent reactions that are promoted by oxygen radicals. Some exemplary antioxidants that may be used in the present invention include, but are not limited to, quinoline type antioxidants, amine type antioxidants, and phenolic type antioxidants. A preferred antioxidant is 2,2'-methylene-bis-(4-methyl-6-t-butylphenol) available as VANOX® MBPC from R.T. Vanderbilt. Other polyphenolic antioxidants include VANOX® T, VANOX® L, VANOX® SKT, VANOX® SWP, VANOX® 13 and VANOX® 1290. Suitable antioxidants include, but are not limited to, alkylene-bis-alkyl substituted cresols, such as 4,4'-methylene-bis(2,5-xylenol); 4,4'-ethylidene-bis-(6-ethyl-m-cresol); 4,4'-butylidene-bis-(6-t-butyl-m-cresol); 4,4'-decylidene-bis-(6-methyl-m-cresol); 4,4'-methylene-bis-(2-amyl-m-cresol); 4,4'-propylidene-bis-(5-hexyl-m-cresol); 3,3'-decylidene-bis-(5-ethyl-p-cresol); 2,2'-butylidene-bis-(3-n-hexyl-p-cresol); 4,4'-(2-butylidene)-bis-(6-t-butyl-m-cresol); 3,3'-4(decylidene)-bis-(5-ethyl-p-cresol); (2,5-dimethyl-4-hydroxyphenyl) (2-hydroxy-3,5-dimethylphenyl) methane; (2-methyl-4-hydroxy-5-ethylphenyl) (2-ethyl-3-hydroxy-5-methylphenyl) methane; (3-methyl-5-hydroxy-6-t-butylphenyl) (2-hydroxy-4-methyl-5-decylphenyl)-n-butyl methane; (2-hydroxy-4-ethyl-5-methylphenyl) (2-decyl-3-hydroxy-4-methylphenyl)butylamylmethane; (3-ethyl-4-methyl-5-hydroxyphenyl)-(2,3-dimethyl-3-hydroxy-phenyl) nonylmethane; (3-methyl-2-hydroxy-6-ethylphenyl)-(2-isopropyl-3-hydroxy-5-methyl-phenyl)cyclohexylmethane; (2-methyl-4-hydroxy-5-methylphenyl) (2-hydroxy-3-methyl-5-ethylphenyl)dicyclohexyl methane; and the like.

Other suitable antioxidants include, but are not limited to, substituted phenols, such as 2-tert-butyl-4-methoxyphenol;

3-tert-butyl-4-methoxyphenol; 3-tert-octyl-4-methoxyphenol; 2-methyl-4-methoxyphenol; 2-stearyl-4-n-butoxyphenol; 3-t-butyl-4-stearyloxyphenol; 3-lauryl-4-ethoxyphenol; 2,5-di-t-butyl-4-methoxyphenol; 2-methyl-4-methoxyphenol; 2-(1-methycyclohexyl)-4-methoxyphenol; 2-t-butyl-4-dodecyloxyphenol; 2-(1-methylbenzyl)-4-methoxyphenol; 2-t-octyl-4-methoxyphenol; methyl gallate; n-propyl gallate; n-butyl gallate; lauryl gallate; myristyl gallate; stearyl gallate; 2,4,5-trihydroxyacetophenone; 2,4,5-trihydroxy-n-butyrophenone; 2,4,5-trihydroxystearophenone; 2,6-ditert-butyl-4-methylphenol; 2,6-ditert-octyl-4-methylphenol; 2,6-ditert-butyl-4-stearylphenol; 2-methyl-4-methyl-6-tert-butylphenol; 2,6-distearyl-4-methylphenol; 2,6-dilauryl-4-methylphenol; 2,6-di(n-octyl)-4-methylphenol; 2,6-di(n-hexadecyl)-4-methylphenol; 2,6-di(1-methylundecyl)-4-methylphenol; 2,6-di(1-methylheptadecyl)-4-methylphenol; 2,6-di(trimethylhexyl)-4-methylphenol; 2,6-di(1,1,3,3-tetramethyloctyl)-4-methylphenol; 2-n-dodecyl-6-tert butyl-4-methylphenol; 2-n-dodecyl-6-(1-methylundecyl)-4-methylphenol; 2-n-dodecyl-6-(1,1,3,3-tetramethyloctyl)-4-methylphenol; 2-n-dodecyl-6-n-octadecyl-4-methylphenol; 2-n-dodecyl-6-n-octyl-4-methylphenol; 2-methyl-6-n-octadecyl-4-methylphenol; 2-n-dodecyl-6-(1-methylheptadecyl)-4-methylphenol; 2,6-di(1-methylbenzyl)-4-methylphenol; 2,6-di(1-methylcyclohexyl)-4-methylphenol; 2,6-(1-methylcyclohexyl)-4-methylphenol; 2-(1-methylbenzyl)-4-methylphenol; and related substituted phenols.

More suitable antioxidants include, but are not limited to, alkylene bisphenols, such as 4,4'-butylidene bis(3-methyl-6-t-butyl phenol); 2,2-butylidene bis (4,6-dimethyl phenol); 2,2'-butylidene bis(4-methyl-6-t-butyl phenol); 2,2'-butylidene bis(4-t-butyl-6-methyl phenol); 2,2'-ethylidene bis(4-methyl-6-t-butylphenol); 2,2'-methylene bis(4,6-dimethyl phenol); 2,2'-methylene bis(4-methyl-6-t-butyl phenol); 2,2'-methylene bis(4-ethyl-6-t-butyl phenol); 4,4'-methylene bis(2,6-di-t-butyl phenol); 4,4'-methylene bis(2-methyl-6-t-butyl phenol); 4,4'-methylene bis(2,6-dimethyl phenol); 2,2'-methylene bis(4-t-butyl-6-phenyl phenol); 2,2'-dihydroxy-3,3',5,5'-tetramethylstilbene; 2,2'-isopropylidene bis (4-methyl-6-t-butyl phenol); ethylene bis (beta-naphthol); 1,5-dihydroxy naphthalene; 2,2'-ethylene bis (4-methyl-6-propyl phenol); 4,4'-methylene bis(2-propyl-6-t-butyl phenol); 4,4'-ethylene bis (2-methyl-6-propyl phenol); 2,2'-methylene bis(5-methyl-6-t-butyl phenol); and 4,4'-butylidene bis(6-t-butyl-3-methyl phenol);

Suitable antioxidants further include, but are not limited to, alkylene trisphenols, such as 2,6-bis (2'-hydroxy-3'-t-butyl-5'-methyl benzyl)-4-methyl phenol; 2,6-bis (2'-hydroxy-3'-t-ethyl-5'-butyl benzyl)-4-methyl phenol; and 2,6-bis(2'-hydroxy-3'-t-butyl-5'-propyl benzyl)-4-methyl phenol.

The antioxidant is typically present in an amount of about 0.1 phr to about 5 phr, preferably from about 0.1 phr to about 2 phr, more preferably about 0.1 phr to about 1 phr. In a particularly preferred embodiment, the antioxidant is present in an amount of about 0.4 phr. In an alternative embodiment, the antioxidant should be present in an amount to ensure that the hardness gradient of the inventive cores is negative. Preferably, about 0.2 phr to about 1 phr antioxidant is added to the core layer (inner core or outer core layer) formulation, more preferably, about 0.3 to about 0.8 phr, and most preferably 0.4 to about 0.7 phr. Preferably, about 0.25 phr to about 1.5 phr of peroxide as calculated at 100% active can be added to the core formulation, more preferably about 0.5 phr to about 1.2 phr, and most preferably about 0.7 phr to about 1.0 phr. The ZDA amount can be varied to suit the desired compression, spin and feel of the resulting golf ball.

The cure regime can have a temperature range between from about 290° F. to about 335° F., more preferably about 300° F. to about 325° F., and the stock is held at that temperature for at least about 10 minutes to about 30 minutes.

The thermoset rubber composition of the present invention may also include an optional soft and fast agent. As used herein, "soft and fast agent" means any compound or a blend thereof that that is capable of making a core 1) be softer (lower compression) at constant COR or 2) have a higher COR at equal compression, or any combination thereof, when compared to a core equivalently prepared without a soft and fast agent. Preferably, the composition of the present invention contains from about 0.05 phr to about 10.0 phr soft and fast agent. In one embodiment, the soft and fast agent is present in an amount of about 0.05 phr to about 3.0 phr, preferably about 0.05 phr to about 2.0 phr, more preferably about 0.05 phr to about 1.0 phr. In another embodiment, the soft and fast agent is present in an amount of about 2.0 phr to about 5.0 phr, preferably about 2.35 phr to about 4.0 phr, and more preferably about 2.35 phr to about 3.0 phr. In an alternative high concentration embodiment, the soft and fast agent is present in an amount of about 5.0 phr to about 10.0 phr, more preferably about 6.0 phr to about 9.0 phr, most preferably about 7.0 phr to about 8.0 phr. In a most preferred embodiment, the soft and fast agent is present in an amount of about 2.6 phr.

Suitable soft and fast agents include, but are not limited to, organosulfur or metal-containing organosulfur compounds, an organic sulfur compound, including mono, di, and polysulfides, a thiol, or mercapto compound, an inorganic sulfide compound, a Group VIA compound, or mixtures thereof. The soft and fast agent component may also be a blend of an organosulfur compound and an inorganic sulfide compound.

Suitable soft and fast agents of the present invention include, but are not limited to those having the following general formula:

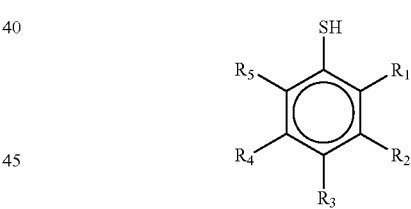

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif.

As used herein when referring to the invention, the term "organosulfur compound(s)" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

Additional suitable examples of soft and fast agents (that are also believed to be cis-to-trans catalysts) include, but are not limited to, 4,4'-diphenyl disulfide; 4,4'-ditolyl disulfide; 2,2'-benzamido diphenyl disulfide; bis(2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis(8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis(5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis(2,5-dichlorophenyl) disulfide; bis(3,5-dichlorophenyl) disulfide; bis (2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl) disulfide; bis(2-acetylphenyl) disulfide; bis(4-formylphenyl) disulfide; bis(4-carbamoylphenyl) disulfide; 1,1'-dinaphthyl disulfide; 2,2'-dinaphthyl disulfide; 1,2'-dinaphthyl disulfide; 2,2'-bis(1-chlorodinaphthyl) disulfide; 2,2'-bis(1-bromonaphthyl) disulfide; 1,1'-bis(2-chloronaphthyl) disulfide; 2,2'-bis(1-cyanonaphthyl) disulfide; 2,2'-bis(1-acetylnaphthyl) disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound is also suitable as a soft and fast agent. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The soft and fast agent can also include a Group VIA component. Elemental sulfur and polymeric sulfur are commercially available from Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY® and an exemplary selenium catalyst under the tradename VANDEX® are each commercially available from RT Vanderbilt.

Other suitable soft and fast agents include, but are not limited to, hydroquinones, benzoquinones, quinhydrones, catechols, and resorcinols.

Suitable hydroquinone compounds include compounds represented by the following formula, and hydrates thereof:

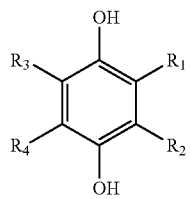

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable hydroquinone compounds include, but are not limited to, hydroquionone; tetrachlorohydroquinone; 2-chlorohydroquionone; 2-bromohydroquinone; 2,5-dichlorohydroquinone; 2,5-dibromohydroquinone; tetrabromohydroquinone; 2-methylhydroquinone; 2-t-butylhydroquinone; 2,5-di-t-amylhydroquinone; and 2-(2-chlorophenyl) hydroquinone hydrate.

More suitable hydroquinone compounds include compounds represented by the following formula, and hydrates thereof:

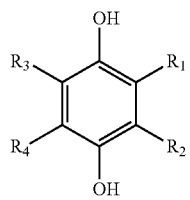

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable benzoquinone compounds include compounds represented by the following formula, and hydrates thereof:

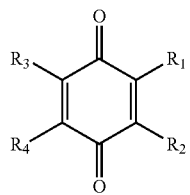

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable benzoquinone compounds include one or more compounds represented by the following formula, and hydrates thereof:

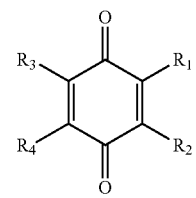

wherein each $R_1$, $R_2$, $R_3$, and $R_4$ are a metal salt of a carboxyl; acetate and esters thereof; hydroxy; a metal salt of a hydroxy; amino; nitro; aryl; aryloxy; arylalkyl; nitroso; acetamido; or vinyl.

Suitable quinhydrones include one or more compounds represented by the following formula, and hydrates thereof:

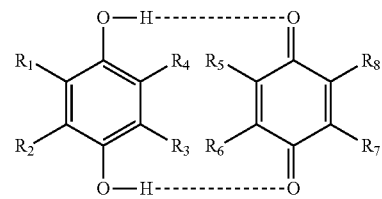

wherein each $R_1$, $R_2$, $R_3$, $R_4$, $R_5$, $R_6$, $R_7$, and $R_8$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Other suitable quinhydrones include those having the above formula, wherein each $R_1$, $R_2$, $R_3$, $R_4$, $R_5$, $R_6$, $R_7$, and $R_8$ are a metal salt of a carboxyl; acetate and esters thereof; hydroxy; a metal salt of a hydroxy; amino; nitro; aryl; aryloxy; arylalkyl; nitroso; acetamido; or vinyl. Suitable catechols include one or more compounds represented by the following formula, and hydrates thereof:

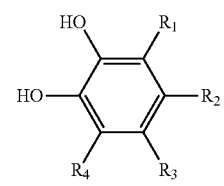

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Suitable resorcinols include one or more compounds represented by the following formula, and hydrates thereof:

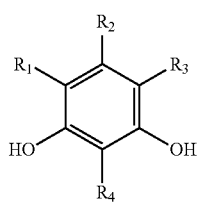

wherein each $R_1$, $R_2$, $R_3$, and $R_4$ are hydrogen; halogen; alkyl; carboxyl; metal salts thereof, and esters thereof; acetate and esters thereof; formyl; acyl; acetyl; halogenated carbonyl; sulfo and esters thereof; halogenated sulfonyl; sulfino; alkylsulfinyl; carbamoyl; halogenated alkyl; cyano; alkoxy; hydroxy and metal salts thereof; amino; nitro; aryl; aryloxy; arylalkyl; nitroso; acetamido; or vinyl.

Fillers may also be added to the thermoset rubber composition of the core to adjust the density of the composition, up or down. Typically, fillers include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, trans-regrind core material (recycled core material containing high trans-isomer of polybutadiene), and the like. When trans-regrind is present, the amount of trans-isomer is preferably between about 10% and about 60%. In a preferred embodiment of the invention, the core comprises polybutadiene having a cis-isomer content of greater than about 95% and trans-regrind core material (already vulcanized) as a filler. Any particle size trans-regrind core material is sufficient, but is preferably less than about 125 µm.

Fillers added to one or more portions of the golf ball typically include processing aids or compounds to affect rheological and mixing properties, density-modifying fillers, tear strength, or reinforcement fillers, and the like. The fillers are generally inorganic, and suitable fillers include numerous metals or metal oxides, such as zinc oxide and tin oxide, as well as barium sulfate, zinc sulfate, calcium carbonate, barium carbonate, clay, tungsten, tungsten carbide, an array of silicas, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

Materials such as tungsten, zinc oxide, barium sulfate, silica, calcium carbonate, zinc carbonate, metals, metal oxides and salts, and regrind (recycled core material typically ground to about 30 mesh particle) are also suitable fillers.

The polybutadiene and/or any other base rubber or elastomer system may also be foamed, or filled with hollow microspheres or with expandable microspheres which expand at a set temperature during the curing process to any low specific gravity level. Other ingredients such as sulfur accelerators, e.g., tetra methylthiuram di, tri, or tetrasulfide, and/or metal-containing organosulfur components may also be used according to the invention. Suitable metal-containing organosulfur accelerators include, but are not limited to, cadmium, copper, lead, and tellurium analogs of diethyldithiocarbamate, diamyldithiocarbamate, and dimethyldithiocarbamate, or mixtures thereof. Other ingredients such as processing aids e.g., fatty acids and/or their metal salts, processing oils, dyes and pigments, as well as other additives known to one skilled in the art may also be used in the present invention in amounts sufficient to achieve the purpose for which they are typically used.

Without being bound by theory, it is believed that the percentage of double bonds in the trans configuration may be manipulated throughout a core containing at least one main-chain unsaturated rubber (i.e., polybutadiene), plastic, or elastomer resulting in a trans gradient. The trans gradient may be influenced (up or down) by changing the type and amount of cis-to-trans catalyst (or soft-and-fast agent), the type and amount of peroxide, and the type and amount of coagent in the formulation. For example, a formulation containing about 0.25 phr ZnPCTP may have a trans gradient of about 5% across the core whereas a formulation containing about 2 phr ZnPCTP may have a trans gradient of about 10%, or higher. The trans gradient may also be manipulated through the cure times and temperatures. It is believed that lower temperatures and shorter cure times yield lower trans gradients, although a combination of many of these factors may yield gradients of differing and/or opposite directions from that resulting from use of a single factor.

The % trans isomer in a core can also be manipulated by adding organosulfur compounds, such as those listed above, to the core formulation including but not limited to pentachlorothiophenol, zinc pentachlorothiophenol, ditolyl disulfide, and diphenyl disulfide. The amount of the organosulfur compound and the overall state of cure affect the amount of the trans isomer that is produced during the cure reaction. Another method of increasing the trans content in a core is to introduce an unsaturated rubber that contains a high level of trans isomer, such as high trans containing polybutadiene or high trans containing polyoctenamer into the core formulation. High trans rubber can be used with or without the organosulfur compounds.

In general, higher and/or faster cure rates tend to yield higher levels of trans content, as do higher concentrations of peroxides, soft-and-fast agents, and, to some extent, ZDA concentration. Even the type of rubber may have an effect on trans levels, with those catalyzed by rare-earth metals, such as Nd, being able to form higher levels of trans polybutadiene compared to those rubbers formed from Group VIII metals, such as Co, Ni, and Li.

The measurement of trans-isomer content of polybutadiene referred to herein was and can be accomplished as follows. Calibration standards are prepared using at least two polybutadiene rubber samples of known trans content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally-spaced points.

Using a commercially-available FUR spectrometer equipped with a Photoacoustic ("PAS") cell, a PAS spectrum of each standard was obtained using the following instrument parameters: scan at speed of 2.5 KHz (0.16 cm/s optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 to 4000 $cm^{-1}$ with a sensitivity setting of 1.

The cis-, trans-, and vinyl-polybutadiene peaks are found between 600-1100 $cm^{-1}$ in the PAS spectrum. The area under each of the trans-polybutadiene peaks can be integrated. Determining the fraction of each peak area relative to the total area of the three isomer peaks allow construction of a calibration curve of the trans-polybutadiene area fraction versus the actual trans-polybutadiene content. The correlation coefficient ($R^2$) of the resulting calibration curve must be a minimum of 0.95.

A PAS spectrum is obtained, using the parameters described above, for the unknown core material at the point of interest (e.g., the surface or center of the core) by filling the PAS cell with a sample containing a freshly cut, uncontaminated surface free of foreign matters, such as mold release and the like. The trans-polybutadiene area fraction of the unknown is analyzed to determine the actual trans-isomer content from the calibration curve.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally-spaced points.

Using an FT-Raman spectrometer equipped with a near-infrared laser, a Stokes Raman spectrum should be obtained from each standard using the following instrument parameters: sufficient laser power (typically 400-800 mW) to obtain good signal-to-noise ratio without causing excessive heating or fluorescence; a resolution of 2 $cm^{-1}$; over a Raman shift spectral range of 400-4000 $cm^{-1}$; and co-adding at least 300 scans.

A calibration curve may be constructed from the data generated above, using a chemometrics approach and software, such as PLSplus/IQ from Galactic Industries Corp. An acceptable calibration was obtained with this software using a PLS-1 curve generated using an SNV (detrend) pathlength correction, a mean center data preparation, and a 5-point SG second derivative over the spectral range of 1600-1700 $cm^{-1}$. The correlation coefficient ($R^2$) of the resulting calibration curve must be at least 0.95.

Preferably, the geometric center of the core has a trans content of about 1% to 10%, more preferably 2% to 9%, and most preferably 4% to 8%. The outer surface of the core preferably has a trans content of about 5% to 15%, more preferably about 7% to 12%, and most preferably about 8% to 10%. A half-radius point in the core preferably has a trans content of about 5% to 16%, more preferably about 6% to 14%, and most preferably about 7% to 13%.

Cores most suitable for the golf balls of the present invention have an outer surface and a center and are formed from a substantially homogenous rubber composition. An intermediate layer, such as a casing layer (inner cover), is disposed about the core, and a cover layer is formed around the intermediate layer, the cover typically formed from a castable polyurea or a castable polyurethane (i.e., meaning covers comprising castable polyurea (100% urea linkages/no urethane linkages); castable polyurethane (100% urethane linkages/no urea linkages); castable hybrid poly(urethane/urea) (the prepolymer is all urethane linkages and is cured with an amine); and castable hybrid poly(urea/urethane) (the prepolymer is all urea linkages and is cured with a polyol). In a preferred embodiment, the outer surface of the core has a trans-polybutadiene content of about 6% to 10%, the center of the core has a trans-polybutadiene content of about 1% to 3%, and the trans content of the outer surface of the core is greater than the trans content of the center by about 6% or greater to define a positive trans gradient along the core radius (i.e., the surface trans content is higher than the center trans content—a core having the opposite disposition of trans content would be considered to have a negative trans gradient and is also envisioned herein).

Referring to FIG. 1, in one embodiment of the present invention the golf ball 10 includes a core 12, an inner cover layer 14, and an outer cover layer 16.

The invention preferably includes a core of at least a single layer, the core having a "low hardness gradient" formulation and cure cycle, herein defined as a "LOG" core. Such LOG cores may have a "positive" Shore C hardness gradient (defined as the core surface hardness minus the geometric center hardness) of from about 1 Shore C to about 10 Shore C, more preferably about 2 Shore C to less than 8 Shore C, and most preferably about 2.5 Shore C to 7.5 Shore C. Where the LOG core includes more than one layer, e.g., a center surrounded by an outer core layer, either or both of the layers may have a low (or shallow) "positive" hardness gradient.

The balls of the present invention preferably include at least a LOG core, a cover layer. Optionally, one or more intermediate layer(s) between the core and cover layer is present. Most preferably, a single layer LOG core having a diameter of about 1.45 to 1.62 inches, more preferably about 1.50 to 1.58 inches, and most preferably about 1.51 to 1.55 inches, is enclosed with two cover layers. The inner cover layer is preferably formed from an ionomeric material, such as a conventional ionomer or a highly-/fully-neutralized ionomer, having a hardness of about 60 Shore D or greater. The outer cover layer is preferably formed from polyurethane, polyurea, or a blend thereof, or a copolymer or hybrid thereof, having a hardness about 60 Shore D or less. In this most preferred embodiment, the LOG core has a geometric center hardness of about 70 to 80 Shore C, more preferably about 72 to 78 Shore C, and a surface hardness of about 71 to 88 Shore C, more preferably about 73 to 80 Shore C, and most preferably, about 74 to 78 Shore C. The LOG core also preferably has a compression (Atti) of about 50 to 90, more preferably about 60 to 80, and a surface trans-polybutadiene content of about 10% or less and a trans-polybutadiene content at the geometric center of about 8% or less.

The optional intermediate layer may be either relatively-hard (Shore C hardness of at least about 85, preferably at least about 90; and a Shore D hardness of at least about 61, preferably at least about 63) or relatively-soft (Shore C hardness about 85 or less, preferably about 83 or less, and a Shore D hardness of about 61 or less, preferably about 57 or less). The intermediate layer may include either a thermoplastic or thermosetting polymeric compositions. Thermosetting compositions include diene rubber based compositions, such as a peroxide or sulfur cured PBR, SBR, EPDM, NR, etc., or a polyurethane, polyurea, epoxy, urethane-acrylate, etc. Thermoplastic materials include ionomers, non-ionomers, polyesters, polyamides, PEBAX or HYTREL TPE's, and styrene-block copolymers (SBS, SEBS, etc).

Cover materials may be any of the same materials disclosed as suitable intermediate layer materials, and may even include a LOG or zero- or low-hardness-gradient rubber formulation/cure, but preferably include an ionomer, a polyurethane, or a polyurea. The cover layer(s) may be either hard or soft, with hardness values as described for the intermediate layers above.

The single (preferably), multi-layer, or multi-piece core may have a diameter of about 0.80 to 1.62 inches, preferably about 1.1 to 1.62 inches, more preferably about 1.2 to 1.60 inches, and most preferably about 1.3 to 1.58 inches. The combination of the LOG core and the intermediate layer(s) preferably have an outer diameter of about 1.0 to 1.66 inches, more preferably about 1.25 to 1.64 inches, and most preferably about 1.40 to 1.62 inches. The cover layer preferably had a thickness of about 0.010 to 0.080 inches, more preferably about 0.015 to 0.060 inches, and most preferably about 0.020 to 0.040 inches.

Generally when a harder cover is employed, it is typically coupled with a relatively-soft intermediate layer to produce a relatively low-spinning golf ball. When a softer cover is used, it is typically coupled with a relatively hard intermediate layer to produce a golf ball having higher spin rates than the same construction using a hard cover. In alternative embodiments, a hard cover can be used with a hard intermediate layer or a soft cover can be used with a soft intermediate layer. It should be understood that the term 'hard' refers to a Shore D hardness of 55 or greater, the term 'soft' refers to a Shore D hardness of 45 or less; a 'typical' hardness would be 45 to 55 Shore D.

In another preferred embodiment the golf ball includes three layers. A LOG core preferably has a shallow "positive" hardness gradient of about 1 to 5 Shore C, a diameter of about 1.55 inches, a compression of about 50 to 100, preferably 65 to 85, and a COR of about 0.800-0.815, preferably 0.800-0.810. The intermediate layer is formed from a thermoplastic ionomer-based composition having a hardness of about 80 Shore C and an outer diameter of about 1.60 inches. A single cover layer is formed from an ionomer and has a thickness of about 0.040 inches and a hardness of about 66 Shore D. An alternative low-compression center embodiment may include a center having a compression of about 1 to 50, more preferably about 10 to 40, most preferably about 15 to 35.

The core of the present invention may also have a Soft Center Deflection Index ("SCDI") compression of less than about 160, more preferably, from about 40 and about 160, and most preferably, from about 60 and about 120.

The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Alternatively, the LOG core of the previous embodiment has a diameter of about 1.450 inches and is encased with an intermediate layer formed from a non-ionomeric thermoplastic (i.e., a PEBAX-type ester-amide block copolymer) having a of about 40 Shore D and an outer diameter of about 1.580 inches. A preferred cover layer is an ionomeric cover layer having a hardness of about 68 Shore D and a thickness of about 0.050 inches.

In still another preferred embodiment, the golf ball includes four layers. The core is formed from a LOG formula as described above and has an outer diameter of about 1.50 inches. The golf ball includes two intermediate layers, each having a thickness of about 0.060 inches. The innermost intermediate layer preferably has a hardness of about 45 Shore D and the outermost intermediate layer has a hardness of about 66 Shore D. The cover layer has a thickness of about 0.030 inches and is formed from a thermosetting, castable polyurethane or polyurea and has a hardness of about 53 Shore D.

In a fourth preferred embodiment, the golf ball includes four layers. The core includes a LOG center having a diameter of about 1.0 inch and an outer core layer. The outer core layer has an outer diameter of about 1.540 inches and a surface hardness of about 89 to 92 Shore C. The outer core layer is formed from a "conventional" polybutadiene rubber formulation and not a LOG formula. The intermediate layer is formed from an ionomer-based material and has an outer diameter of about 1.62 inches and a hardness of about 67 Shore D. The cover is formed from a cast polyurethane or polyurea and has a hardness of about 45 Shore D.

The hardness of the outer surface of the core may be lower than a hardness of the geometric center to define a negative hardness gradient of about −1 to about −15, more preferably about −5 to −10. The outer surface of the core may have a hardness of about 68 to about 80 Shore C and the geometric center has a hardness of about 68 to 80 Shore C. A hardness measured at the outer surface of the core may also be greater than a hardness of the core center to define a positive hardness gradient of about 0 to 5, more preferably about 2 to 5. The core preferably has a diameter of about 1.5 inches to 1.59 inches, more preferably about 1.51 to 1.57 inches, most preferably about 1.51 inches to 1.55 inches, including, specifically, 1.51 inches, 1.53 inches, or 1.55 inches.

The above embodiments may be tailored to meet predetermined performance properties. For example, alternative embodiments include those having an inner core having an outer diameter of about 0.250 inches to about 1.550 inches, preferably about 0.500 inches to about 1.500 inches, and more preferably about 0.750 inches to about 1.400 inches. In preferred embodiments, the inner core has an outer diameter of about 1.000 inch, 1.200 inches, or 1.300 inches, with a most preferred outer diameter being 1.130 inches. The outer core layer should have an outer diameter (the entire dual core) of about 1.30 inches to about 1.620 inches, preferably 1.400 inches to about 1.600 inches, and more preferably about 1.500 inches to about 1.590 inches. In preferred embodiments, the outer core layer has an outer diameter of about 1.510 inches, 1.530 inches, or most preferably 1.550 inches.

A number of cores were formed based on the formulation and cure cycle described in TABLE 2 below and core hardness values are reported in TABLE 3 below.

TABLE 2

| Formulation (phr) | Ex 1 | Ex 2 | Ex 3 | Comp Ex 1 | Comp Ex 2 | Comp Ex 3 |
|---|---|---|---|---|---|---|
| SR-526+ | 34.0 | 34.0 | 31.2 | 29.0 | 29.0 | 29.0 |
| ZnO | 5 | 5 | 5 | 5 | 5 | 5 |
| BaSO$_4$ | 11.2 | 11.2 | 16.1 | 13.8 | 13.8 | 13.8 |
| Vanox MBPC* | 0.40 | 0.40 | 0.40 | — | 0.50 | — |
| Trigonox-265-50B** | 1.4 | 1.4 | 1.6 | — | — | 0.8 |
| Perkadox BC-FF*** | — | — | — | 1.0 | 1.6 | — |
| polybutadiene | 100 | 100 | 100 | 100 | 100 | 100 |
| ZnPCTP | 2.35 | 2.35 | 2.60 | 2.35 | 2.35 | 2.35 |
| regrind | — | — | 17 | 17 | — | — |
| antioxidant/initiator ratio | 0.57 | 0.57 | 0.50 | — | 0.31 | — |
| Cure Temp. (° F.) | 305 | 315 | 320 | 350 | 335 | 335 |
| Cure Time (min) | 14 | 11 | 16 | 11 | 11 | 11 |
| Properties | | | | | | |
| diameter (in) | 1.530 | 1.530 | 1.530 | 1.530 | 1.530 | 1.530 |
| compression | 69 | 63 | 70 | 69 | 47 | — |
| COR @ 125 ft/s | 0.808 | 0.806 | 0.804 | 0.804 | — | — |

*Vanox MBPC: 2,2'-methylene-bis-(4-methyl-6-t-butylphenol) available from R. T. Vanderbilt Company Inc.;
**Trigonox 265-50B: a mixture of 1,1-di(t-butylperoxy)-3,3,5-trimethycyclohexane and di(2-t-butylperoxyisopropyl) benzene 50% active on an inert carrier available from Akzo Nobel;
***Perkadox BC-FF: Dicumyl peroxide (99%-100% active) available from Akzo Nobel; and
+SR-526: ZDA available from Sartomer

TABLE 3

| | Shore C Hardness | | | | | |
|---|---|---|---|---|---|---|
| Distance from Center | Ex 1 | Ex 2 | Ex 3 | Comp Ex 1 | Comp Ex 2 | Comp Ex 3 |
| Center | 73 | 70 | 71 | 61 | 52 | 61 |
| 2 | 74 | 71 | 72 | 67 | 57 | 62 |
| 4 | 74 | 72 | 73 | 70 | 62 | 65 |
| 6 | 75 | 73 | 73 | 72 | 64 | 67 |
| 8 | 75 | 73 | 73 | 73 | 64 | 69 |
| 10 | 75 | 73 | 74 | 73 | 64 | 71 |
| 12 | 74 | 74 | 73 | 72 | 66 | 72 |
| 14 | 74 | 74 | 72 | 73 | 70 | 73 |
| 16 | 70 | 71 | 70 | 77 | 71 | 73 |
| 18 | 60 | 60 | 63 | 80 | 72 | 73 |
| Surface | 63 | 70 | 66 | 85 | 73 | 74 |
| Surface − Center | −10 | 0 | −5 | 24 | 21 | 13 |

A number of cores were prepared and hardness measurements were made across the core. The cores, designated as Examples 1-4 in Table 4 below, all had an outer diameter of 1.53 inches. The hardness, in Shore C, was measured according to ASTM D-2240 at various locations across a cross-section of the core. The hardness results are tabulated below for the geometric center, outer surface, and at locations 2-mm, 4-mm, 6-mm, 8-mm, 10-mm, 12-mm, 14-mm, 16-mm, and 18-mm radially-outward from the geometric center of the core. The general core formulation included ≥85 phr CB1221 polybutadiene rubber, ≤15 phr CB23 polybutadiene rubber, about 35 phr zinc diacrylate, about 1 phr peroxide, about 0.5 phr VANOX MBPC, about 5 phr ZnO, about 0.5 phr ZnPCTP, about 1 phr AFLUX 16, about 13 phr POLYWATE 325, and about 15 phr regrind. The cure cycles were adjusted, as necessary, to vary the hardness gradient across the core. Temperature/time criteria varied between about 330° F./20 min, 335° F./18 min, 340° F./16 min, and 345° F./14 min.

TABLE 4

| Core Location | Ex A hardness (Shore C) | Ex B hardness (Shore C) | Ex C hardness (Shore C) | Ex D hardness (Shore C) |
|---|---|---|---|---|
| Center | 73.1 | 73.1 | 72.1 | 73.9 |
| 2 mm | 72.2 | 72.1 | 73.2 | 75.2 |
| 4 mm | 72.9 | 73.9 | 75.3 | 75.9 |
| 6 mm | 73.7 | 74.3 | 76.5 | 77.2 |
| 8 mm | 74.0 | 74.3 | 76.5 | 77.1 |
| 10 mm | 74.7 | 73.8 | 76.5 | 76.7 |
| 12 mm | 73.9 | 73.9 | 77.1 | 76.8 |
| 14 mm | 73.9 | 73.4 | 76.7 | 76.7 |
| 16 mm | 74.3 | 73.7 | 76.1 | 76.5 |
| 18 mm | 74.5 | 74.3 | 75.5 | 76.1 |
| Surface | 74.6 | 75.1 | 75.7 | 78.2 |
| Hardness Gradient | 1.5 | 2.0 | 3.6 | 4.3 |

The hardness gradients, as seen in Table 4 above, range from 1.5 to 4.3 Shore C. These are shallow positive gradients and are determined by subtracting the hardness at the geometric center from the hardness at the surface of the core.

Cores formed from the same general formula as described above are also tested for the % cis-polybutadiene, % trans-polybutadiene, and % vinyl-polybutadiene. The results are presented below in Table 5.

TABLE 5

| Core | % Trans | % Vinyl | % Cis |
|---|---|---|---|
| Ex E outer surface | 7.6 | 2.7 | 89.6 |
| Ex E half radius | 7.8 | 2.8 | 89.4 |
| Ex E center | 7.4 | 2.8 | 89.7 |
| Ex F outer surface | 9.2 | 2.7 | 88.4 |
| Ex F half radius | 13.2 | 2.6 | 85.4 |
| Ex F center | 8.5 | 2.9 | 88.6 |
| Ex G outer surface | 8.7 | 2.8 | 88.5 |
| Ex G half radius | 12.6 | 2.6 | 85.7 |
| Ex G center | 7.3 | 2.6 | 90.1 |

The surface hardness of a core is obtained from the average of a number of measurements taken from opposing hemispheres of a core, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface of a core, care must be taken to insure that the core is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand, such that the weight on the durometer and attack rate conform to ASTM D-2240.

To prepare a core for hardness gradient measurements, the core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut, made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' core surface is ground to a smooth, flat surface, revealing the geometric center of the core, which can be verified by measuring the height of the bottom of the holder to the exposed surface of the core, making sure that exactly half of the original height of the core, as measured above, has been removed to within ±0.004 inches.

Leaving the core in the holder, the center of the core is found with a center square and carefully marked and the hardness is measured at the center mark. Hardness measurements at any distance from the center of the core may be measured by drawing a line radially outward from the center mark, and measuring and marking the distance from the center, typically in 2-mm increments. All hardness measurements performed on the plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for single, solid core, such that a core surface softer than its center will have a negative hardness gradient.

Referring to TABLES 2-3, in Example 1, the surface is 10 Shore C points lower than the center hardness and 12 Shore C points lower than the hardest point in the core. In Example 3, the surface is 5 Shore C points lower than the center hardness and 8 Shore C points lower than the hardest point in the core. In Example 2, the center and surface hardness values are equal and the softest point in the core is 10 Shore C points lower than the surface.

In the examples of the invention presented in TABLE 2, the cure temperatures are varied from 305° F. to 320° F. and cure times are varied from 11 to 16 minutes. The core compositions of examples 1 and 2 are identical, and only the cure cycle is changed. In example 3 the amount of antioxidant is identical to examples 1 and 2, but other ingredients are varied as well the cure cycle. Additionally, the ratio of antioxidant to initiator varies from 0.50 to 0.57 from example 1 and 2 to example 3.

The ratio of antioxidant to initiator is one factor to control the surface hardness of the cores. The data shown in TABLE 2 shows that hardness gradient is at least, but not limited to, a function of the amount of antioxidant and peroxide, their ratio, and the cure cycle. It should be noted that higher antioxidant also requires higher peroxide initiator to maintain the desired compression.

The core of Comparative Example 1, whose composition is shown in TABLE 2 was cured using a conventional cure cycle, with a cure temperature of 350° F. and a cure time of 11 minutes. The inventive cores were produced using cure cycles of 305° F. for 14 minutes, 315° F. for 11 minutes and 320° F. for 16 minutes. The hardness gradients of these cores were measured and the following observations can be made. For the cores of the Comparative Examples, as expected, a conventional hard surface to soft center gradient can be clearly seen. The gradients for inventive cores follow substantially the same shape as one another.

In another alternative embodiment of the present invention, a golf ball has a negative hardness gradient core, single or multi-layer, where at least one of the single core or one of the layers in a multi-layer embodiment has a very soft "skin" or transition region. As used herein, the term "skin" or transition region refers to a portion of a particular layer (i.e., a single core, a core layer, etc.), is not a separate, discreet layer, and is not formed by a surface treatment.

The soft skin (transition region) of the core preferably has a hardness of about 70 Shore C or less, more preferably about 65 Shore C or less, and most preferably about 60 Shore C or less. The hardness at the geometric center of the core is preferably greater than the surface hardness such that the core has a "negative hardness gradient" across the entire cross section of the core. The negative hardness gradient of the inventive core is preferably about 1 to 40 Shore C, more preferably about 5 to 35 Shore C, and most preferably about 10 to 30 Shore C. In more preferred embodiments, the negative hardness gradient is up to about 20 Shore C, more preferably about 1 to 20 Shore C, 5 to 20 Shore C, 10 to 20 Shore C, or 10 to 15 Shore C.

In a dual core embodiment of the invention, which includes an inner core and outer core layer, the soft skin may be part of the inner core, the outer core, or both. In dual core embodiments, because the dimensions of the components are smaller than for a single, unitary core, the region or volume that the soft skin occupies is much greater (a higher percentage of the volume of the component). When the inner core includes the soft skin, the outer core layer may have a negative hardness gradient, a positive hardness gradient, or a zero hardness gradient.

The soft skin or transition region occupies a volume or region that is close to the surface of the core (or core layer). In a most preferred embodiment, the soft skin or transition region does not includes the surface. The soft skin or transition volume/region is created by using a specific rubber composition and a specific cure process. Preferably, the composition includes at least one polybutadiene rubber, such as CB23 and other suitable rubbers disclosed herein, about 20 to 50 parts of ZDA, about 0.1 to 2 parts peroxide, about 0.1 to 2.5 parts of ZnPCTP, optionally 0 to about 0.4 parts of an antioxidant, and about 5 to 25 parts of zinc oxide. A wide range of hardness gradients can be achieved by varying the selection of peroxide type and level and amount of ZnPCTP.

In a preferred embodiment, a core having a narrow-banded, very soft skin was formed with Luperox DI as the peroxide and molded at 311° F. for 20 minutes. The overall negative hardness gradient of the 1.510-inch-diameter core is about 14 Shore C (surface hardness of about 60 Shore C and geometric center hardness of about 74 Shore C). The long, relatively low cure temperature of the process, coupled with the formulation, generates a core having unique physical properties, the narrow band of soft skin, and a negative hardness gradient. In a preferred embodiment, the soft skin has a thickness of about 4 mm or less, more preferably about 3 mm or less and, in an alternative embodiment, about 2 to 4 mm. In these embodiments, the hardness profile is preferably a negative hardness gradient of about 5 Shore C or greater, more preferably about 10 Shore C or greater, and most preferably about 15 Shore C or greater. In an alternative embodiment, the soft skin has a negative hardness gradient of up to about 20 Shore C, about 5 to 20 Shore C, more preferably about 10 to 20 Shore C, or most preferably about 10 to 15 Shore C.

It is important that the cores have a high COR in addition to the soft skin or transition region. Preferably the core having the negative hardness gradient and soft skin transition region has a COR measured at an incoming velocity of 125 ft/s of about 0.800 or greater, more preferably about 0.805 or greater, and most preferably about 0.810 or greater. In a more preferred embodiment, the above core has a compression of about 95 or less, more preferably about 90 or less, and most preferably about 88 or less. In one particularly preferred embodiment, the core has a COR of about 0.813 or greater, a compression of 88 or less, and a negative hardness gradient of at least about 10 Shore C.

Table 6 contains a variety of rubber compositions and properties for golf ball cores formed from those compositions. A number of 1.51-inch single cores were formed and molded at 311° F. for 20 minutes. Example 3 depicts one of the inventive cores having a soft skin transition region at the outer surface of the core.

having a shallow positive hardness gradient (e.g., 75 Shore C at 16 mm from the center of the core—70 Shore C at the center).

Figure 3:
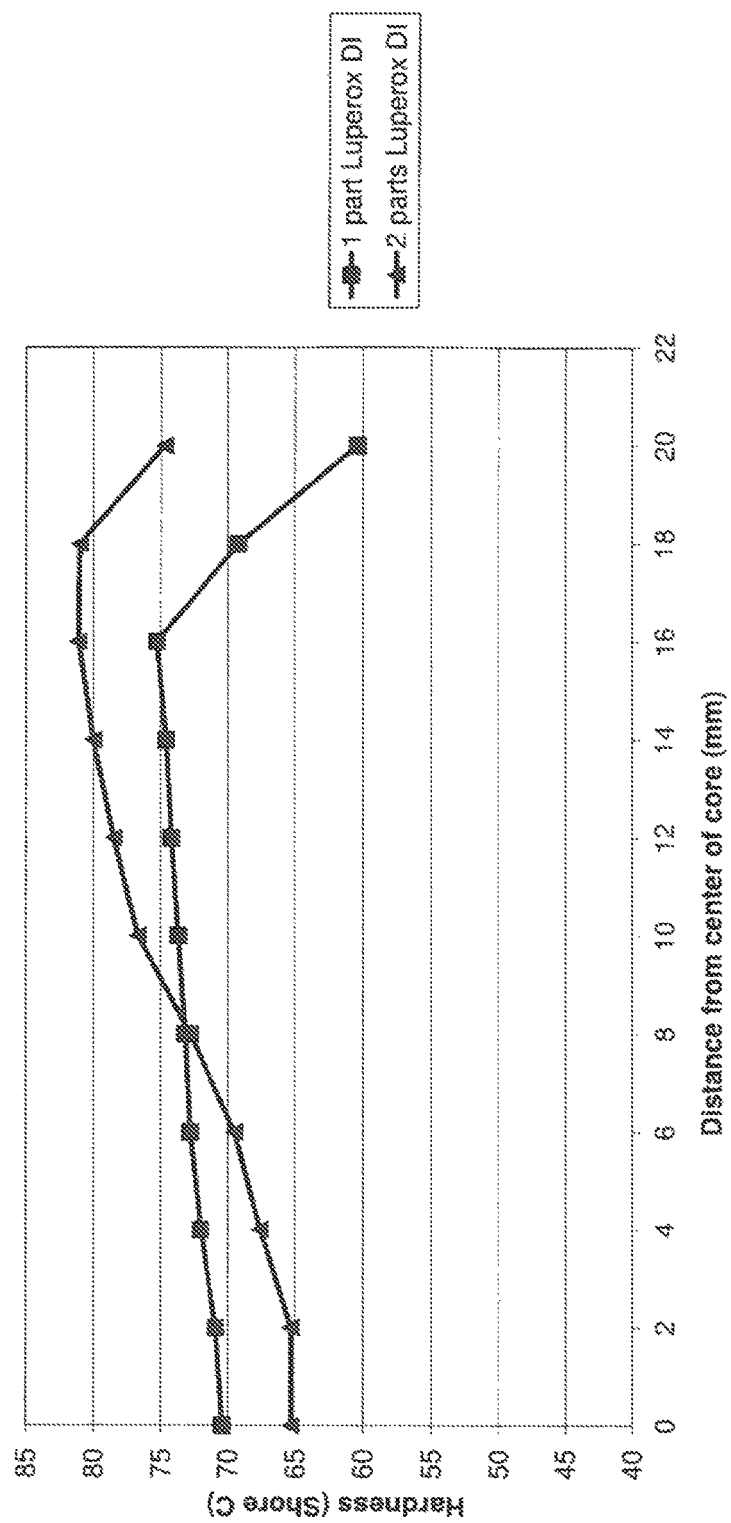
FIG. 3 is a plot of hardness of a core as measured as a function of distance away from the center of a representative inventive core.

FIG. 3 also depicts an alternative embodiment of the present invention. The single, unitary core containing 2 parts Luperox DI has an overall positive hardness gradient of about 9 Shore C (e.g., 74 Shore C at the surface—65 Shore C at the center) but the outermost 2-3 mm soft skin has a negative hardness gradient of about 8 Shore C (e.g., 74 Shore C at the core surface—82 Shore C at a point about 2-3 mm towards the center of the core). Also see Table 6, Ex 7. The amount and type of peroxide, along with the cure process time and temperature determine the soft skin hardness, core compression, and hardness gradient (both direction and magnitude).

In another embodiment of the present invention, the golf ball comprises a unitary core having an outer surface, a geometric center, and a soft transition region adjacent to the outer surface. The core can be formed of any material but is preferably a rubber composition. The soft transition region in the outer portion of the core preferably has a thickness of up to 4 mm. Preferably the thickness of the soft transition region is about 1 mm to about 4 mm, more preferably about 1 mm to about 3 mm, and most preferably about 1 mm to about 2 mm. The soft transition region comprises about 8 to 20 percent trans-polybutadiene isomer. The trans-polybutadiene isomer is preferably about 10 percent to about 20 percent, more preferably about 12 percent to about 19 percent, and most preferably about 14 percent to about 18 percent. The soft transition region also has a negative hardness gradient of up to 15 Shore C, preferably about 1

TABLE 6

|  | Ex 1 | Ex 2 | Ex 3 | Ex 4 | Ex 5 | Ex 6 | Ex 7 |
| --- | --- | --- | --- | --- | --- | --- | --- |
| CB23 | 100 | 100 | 100 | 100 | 100 | 100 | 100 |
| ZDA | 32 | 40 | 40 | 40 | 32 | 32 | 32 |
| Perkadox BC | 1.5 | 0.5 |  |  | 1.5 | 0.5 |  |
| Luperox DI |  |  | 1 |  |  |  | 2 |
| Perkadox 14 |  |  |  | 1 |  |  |  |
| ZnPCTP | 0.2 | 2 | 2 | 2 | 0.2 | 2 | 2 |
| ZnO | 21 | 21 | 21 | 21 | 21 | 21 | 21 |
| BHT |  |  |  |  | 0.2 |  |  |
| Varox MBPC | 0.2 | 0.2 | 0.2 | 0.2 |  | 0.2 | 0.2 |
| Compression | 80 | 88 | 88 | 103 | 88 | 64 | 95 |
| Surface Hardness (Shore C) | 85.6 | 71.2 | 60.4 | 86.5 | 89.6 | 64.5 | 74.7 |
| Center Hardness (Shore C) | 62.8 | 66.8 | 74.0 | 65.7 | 67.2 | 64.8 | 65.3 |
| Gradient | 22.8 | 4.4 | −13.6 | 20.8 | 22.4 | −0.3 | 9.4 |
| CoR @ 125 ft/s | 0.802 | 0.817 | 0.813 | 0.809 | 0.803 | 0.810 | 0.811 |
| % trans in core | 10.0 | 14.7 | 9.2 | 20.2 | 12.5 | 14.4 | 14.0 |

Referring to FIG. 3, as in Ex 3 above in Table 6, a core having a negative hardness gradient and the soft skin of the invention is depicted. Consider in FIG. 3, the hardness profile as measured across a single core clearly shows, for a rubber composition containing 1 part Luperox DI, that the outer 4 mm of the core is the soft skin or the transition region—the overall core has a negative hardness gradient of about 10 Shore C (e.g., 60 Shore C-70 Shore C) but the outer portion of the skin has a hardness of about 60 Shore C that quickly increases to about 75 Shore C over a 4-mm region. Even though the hardness measurements are being taken on a single, unitary core, the soft skin region acts like another layer having a steep negative gradient over an inner layer Shore C to about 15 Shore C, more preferably about 5 Shore C to about 13 Shore C, and most preferably about 7 Shore C to about 10 Shore C. The unitary core has an overall negative hardness gradient of up to 20 Shore C, preferably about 1 Shore C to about 20 Shore C, more preferably about 5 Shore C to about 19 Shore C, and most preferably about 10 Shore C to about 18 Shore C.

Because the inventive core is so unique in its properties, very soft outer portion, negative hardness gradient, high COR (but not high compression), it is defined by a gradient quotient, GQ. The gradient quotient, GQ, is defined by the equation:

$$\frac{G+T}{10 \times COR} \leq 7$$

where G is the overall core (from geometric center to outer surface) negative hardness gradient in Shore C, T is the percent of trans-polybutadiene isomer at the core outer surface, and COR is the coefficient of restitution measured at an incoming velocity of 125 ft/s. Because of the unique properties of the inventive core, it is also suited to be a one-piece golf ball. A one-piece golf ball comprises a sphere (effectively a single, unitary core) formed from a substantially homogenous composition, preferably a rubber-based composition. The sphere has a dimpled outer surface, a geometric center, and a soft transition region adjacent to the dimpled outer surface. The soft transition region has a thickness of up to 4 mm, preferably about 0.5 mm to about 3 mm, more preferably about 0.5 mm to about 2 mm, and most preferably about 1 mm to about 2 mm. In a preferred embodiment, the rubber sphere comprises about 8 to 20 percent trans-polybutadiene isomer, and has a negative hardness gradient of up to 15 Shore C, and wherein the sphere has an overall negative hardness gradient of up to 20 Shore C, but can also have the properties disclosed for the inventive core. The sphere preferably has a gradient quotient, GQ, defined by the equation:

$$\frac{G+T}{10 \times COR} \leq 7$$

where G is the overall negative hardness gradient in Shore C, T is the percent of trans-polybutadiene isomer at the core outer surface, and COR is the coefficient of restitution measured at an incoming velocity of 125 ft/s.

Preferably, the core has a COR of about 0.800 or greater, more preferably about 0.810 or greater, or even 0.813 or greater, which is unusual for a core having such a soft outer portion and comparable compression.

Optionally, the transition region may include about 9 to about 15 percent trans-polybutadiene isomer. The core geometric center includes about 5 to 15 percent trans-polybutadiene isomer. The core outer surface includes about 10 to 30 percent trans-polybutadiene isomer.

In an alternative embodiment, the golf ball includes a single, solid center and at least one cover layer. The solid center may include an outer core layer. The cover maybe formed from an inner cover and an outer cover. An intermediate layer may be included between the core and cover. In one embodiment, when the golf ball is formed from a solid core and an outer cover, the an outer cover layer preferably has a hardness of about 50 Shore M or greater.

The core of this embodiment has an outer surface, a geometric center, and a soft transition region located adjacent to the outer surface. The soft transition region typically has a thickness of about 4 mm or less, preferably about 3 mm or less, more preferably about 2 mm or less, and most preferably about 1 mm to about 2 mm. The soft transition region includes about 10 to 30 percent of a trans-polybutadiene isomer. In one embodiment, the soft transition region includes about 10 to 20 percent of a trans-polybutadiene isomer. In another embodiment, the soft transition region includes about 20 to 30 percent of a trans-polybutadiene isomer. The soft transition region includes about 10 to 30 percent of a trans-polybutadiene isomer also has a positive hardness gradient of about 10 Shore C or less, more preferably about 8 Shore C or less, and most preferably about 5 Shore C or less.

The solid core preferably has an outer surface hardness greater than the hardness at the geometric center to define a positive hardness gradient (differing from the hardness gradient of the soft transition region) of about 10 Shore C to 42 Shore C. Preferably, the core has a positive hardness gradient of about 12 Shore C to 35 Shore C, more preferably the core has a positive hardness gradient of about 13 Shore C to 24 Shore C, and most preferably the core has a positive hardness gradient of about 14 Shore C to 21 Shore C.

The core has a secondary gradient quotient (GQ') that ranges from about 2.2 to 9.5. The secondary gradient quotient, GQ', is defined by the equation:

$$\frac{G'+T}{10 \times COR}$$

where G' is the positive hardness gradient of the solid core in Shore C; T is the percent of trans-polybutadiene isomer at the core outer surface, and COR is the coefficient of restitution of the core measured at an incoming velocity of 125 ft/s. This relationship may also be represented as:

$$2.2 \leq \frac{G'+T}{10 \times COR} \leq 9.5$$

In another embodiment, the core has a secondary gradient quotient (GQ') that ranges from about 7.5 to 9.5. This relationship may also be represented as:

$$7.5 \leq \frac{G'+T}{10 \times COR} \leq 9.5$$

Accordingly, the core typically has a coefficient of restitution measured at an incoming velocity of 125 ft/s of about 0.800 or greater, preferably about 0.810 or greater.

The secondary gradient quotient, GQ', is preferably about 2.5 to 8.5, more preferably the secondary gradient quotient, GQ', is about 2.7 to 6.9, and most preferably the secondary gradient quotient, GQ', is about 2.9 to 6.5. The second positive hardness gradient is preferably about 12 Shore C to about 35 Shore C, more preferably the second positive hardness gradient is about 13 Shore C to about 24 Shore C, and most preferably the second positive hardness gradient is about 14 Shore C to about 21 Shore C.

The golf ball may include one or more coating layers disposed about the outer cover layer. The one or more coating layers preferably have a thickness of about 0.003 inches or less, more preferably about 0.002 inches of less, and most preferably about 0.001 inches or less. In a preferred embodiment, the golf ball includes 3 coating layers, each layer having a thickness of about 0.001 inches to about 0.003 inches. The one or more coating layers preferably have a Shore M hardness of about 60 Shore M or less, more preferably about 55 Shore M or less, and most preferably about 50 Shore M or less.

The one or more coating layers preferably have an instrumented hardness of about 1 MPa to about 23 MPa, more preferably the one or more coating layers have an instrumented hardness of about 1 MPa to about 10 MPa, and most preferably the one or more coating layers have an instrumented hardness of about 4 MPa to about 7 MPa. In one alternative embodiment, the one or more coating layers have an instrumented hardness of about 25 MPa to about 26 MPa.

The soft transition region of the golf ball may include about 10 to about 20 percent trans-polybutadiene isomer or, alternatively, the soft transition region may include about 20 to about 30 percent trans-polybutadiene isomer.

If the golf ball includes the optional inner cover layer it is typically formed from an ionomer or ionomer blend. Preferably, the ionomer comprises a lithium ionomer or a sodium ionomer, or both.

Alternatively, the soft transition region adjacent to the outer surface comprises about 10 to 30 percent of a trans-polybutadiene isomer and has a positive hardness gradient of about 10 Shore C or less. This core has an outer surface hardness greater than a hardness at the geometric center to define a positive hardness gradient of about 12 Shore C to 24 Shore C, and a secondary gradient quotient, GQ', from about 7.5 to 9.5, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s. The outer cover layer has a hardness of about 50 Shore M or greater.

In a low trans-polybutadiene embodiment, the soft transition region adjacent to the outer surface comprises about 2 percent to about 10 percent of a trans-polybutadiene isomer, which can be achieved by eliminating the use of aromatic sulfur compounds, such as pentachlorothiophenol ("PCTP"), the zinc salt of PCTP ("ZnPCTP"), or dithiodisulfide ("DTDS"). The trans-polybutadiene isomer content at the surface and geometric center of the core is also very low. The trans-polybutadiene isomer content at the core surface is preferably about 2 percent to about 10 percent, more preferably about 2 percent to about 8 percent, and most preferably about 4 percent to about 8 percent. The trans-polybutadiene isomer content at the geometric center of the core is preferably about 1 percent to about 10 percent, more preferably about 1 percent to about 8 percent, and most preferably about 3 percent to about 8 percent.

This type of core also has an outer surface hardness greater than a hardness at the geometric center to define a positive hardness gradient of about 10 Shore C to 48 Shore C. Preferably the positive hardness gradient is about 12 Shore C to 28 Shore C, more preferably the positive hardness gradient is about 13 Shore C to 16 Shore C, and most preferably the positive hardness gradient is about 14 Shore C to 18 Shore C.

Because the inventive core is so unique in its properties (soft outer portion, positive hardness gradient, high COR, but not necessarily having a high compression), it is defined by a secondary gradient quotient, GQ'. The secondary gradient quotient, GQ', from about 1.5 to about 7.25, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s. Accordingly, the core typically has a coefficient of restitution measured at an incoming velocity of 125 ft/s of about 0.800 or greater, preferably about 0.810 or greater. The secondary gradient quotient is preferably about 2.5 to about 6.25, more preferably secondary gradient quotient is about 3 to about 5.

In a high trans-polybutadiene embodiment, the soft transition region adjacent to the outer surface comprises about 10 percent to about 45 percent of a trans-polybutadiene isomer, which can be achieved by changing the levels of aromatic sulfur compounds, such as pentachlorothiophenol ("PCTP"), the zinc salt of PCTP ("ZnPCTP"), or dithiodisulfide ("DTDS"), as well as changing the type and level of peroxide and/or cure cycle. Preferred levels of aromatic sulfur compounds are about 0.5 parts to about 5 parts, more preferably about 1 part of about 4 parts, most preferably about 2 parts to about 4 parts.

The trans-polybutadiene isomer content at the surface and geometric center of the core is also very high. The trans-polybutadiene isomer content at the core surface is preferably about 30 percent to about 50 percent, more preferably about 35 percent to about 45 percent, and most preferably about 38 percent to about 42 percent. The trans-polybutadiene isomer content at the geometric center of the core is preferably about 10 percent to about 35 percent, more preferably about 15 percent to about 30 percent, and most preferably about 20 percent to about 25 percent.

This type of core also has an outer surface hardness greater than a hardness at the geometric center to define a positive hardness gradient of about 10 Shore C to 68 Shore C. Preferably the positive hardness gradient is about 12 Shore C to 45 Shore C, more preferably the positive hardness gradient is about 14 Shore C to 35 Shore C, and most preferably the positive hardness gradient is about 16 Shore C to 30 Shore C.

Because the inventive core is so unique in its properties (soft outer portion, positive hardness gradient, high COR, but not necessarily having a high compression), it is defined by a secondary gradient quotient, GQ'. The secondary gradient quotient, GQ', from about 4 to about 13, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s. Accordingly, the core typically has a coefficient of restitution measured at an incoming velocity of 125 ft/s of about 0.790 or greater, preferably 0.800 or greater, more preferably about 0.810 or greater, and most preferably about 0.810 to about 0.825. The secondary gradient quotient is preferably about 3.75 to about 12.75, more preferably secondary gradient quotient is about 5 to about 11.

The golf ball comprises an outer cover layer that has a hardness of about 50 Shore M or greater. Shore M hardness measurements can be made on a Shore® 51 Micro Hardness Model 719 Digital Durometer, or the equivalent, according to ASTM procedure D2240 as it relates to measuring Shore M hardness.

The microhardness measurements were conducted with a Modified Berkovich diamond indenter mounted on a TA Instruments® Q800 DMA in force-controlled compression mode. The measurement cycle used a 15-second load, 20-second hold, and a 15-second unload with a 100 mN maximum force. Instrumented Hardness ("HIT") was determined for each sample by a calculation using the maximum force applied, the contact area, and depth of the indenter at maximum deformation, and the slope of the unload curve as described in ASTM procedure E2546-07, Standard Practice for Instrumented Indentation Testing. Martens hardness was also determined for each sample using the values obtained from the force/indentation depth data at the end of the load cycle after reaching maximum force in accordance with ISO 14577-1:2015(E) Annex A.2.1. Samples for the analysis were prepared by gently pressing the golf ball into a hemispherical holder and using a surface grinding machine to remove any material above the equator of the golf ball (leaving about half of the golf ball), exposing the geometric center. The remaining golf ball hemisphere is removed from the fixture, flipped, and ground with a surface grinder to remove enough of the remaining half to form a 6-10 mm 'puck' having the center of the ball as one of the smooth, flat, and parallel surfaces. Samples were held at 23° C./50% relative humidity ("RH") for at least two days after preparation before hardness measurements being taken at room temperature.

In many preferred embodiments of invention, the hardness of the core at the surface is at most about the same as or substantially less than the hardness of the core at the center. Furthermore, the center hardness of the core may not be the hardest point in the core, but in all cases, it is preferred that it is at least equal to or harder than the surface. Additionally, the lowest hardness anywhere in the core does not have to occur at the surface. In some embodiments, the lowest hardness value occurs within about the outer 6 mm of the core surface. However, the lowest hardness value within the core can occur at any point from the surface, up to, but not including the center, as long as the surface hardness is still equal to, or less than the hardness of the center. It should be noted that in the present invention the formulation is the same throughout the core, or core layer, and no surface treatment is applied to the core to obtain the preferred surface hardness.

Golf ball layers of the inventive golf ball such as intermediate layers and/or inner cover layers may also be formed from ionomeric polymers, preferably highly-neutralized ionomers (HNP). In a preferred embodiment, at least one intermediate layer of the golf ball is formed from an HNP material or a blend of HNP materials. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth)acrylic acid/ethyl acrylate, and ethylene/(meth) acrylic acid/methyl acrylate copolymers.

Ionomers are typically neutralized with a metal cation, such as Li, Na, Mg, K, Ca, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be more conventional ionomers, i.e., partially-neutralized with metal cations. The acid moiety in the acid copolymer is neutralized about 1 to about 90%, preferably at least about 20 to about 75%, and more preferably at least about 40 to about 70%, to form an ionomer, by a cation such as lithium, sodium, potassium, magnesium, calcium, barium, lead, tin, zinc, aluminum, or a mixture thereof.

In a preferred embodiment, the inventive single-layer core is enclosed with two cover layers, where the inner cover layer has a thickness of about 0.01 inches to about 0.06 inches, more preferably about 0.015 inches to about 0.040 inches, and most preferably about 0.02 inches to about 0.035 inches, and the inner cover layer is formed from a partially- or fully-neutralized ionomer having a Shore D hardness of greater than about 55, more preferably greater than about 60, and most preferably greater than about 65. In this embodiment, the outer cover layer should have a thickness of about 0.015 inches to about 0.055 inches, more preferably about 0.02 inches to about 0.04 inches, and most preferably about 0.025 inches to about 0.035 inches, and has a hardness of about Shore D 60 or less, more preferably 55 or less, and most preferably about 52 or less. The inner cover layer should be harder than the outer cover layer. In this embodiment the outer cover layer comprises a thermoset polyurethane, polyurethane, polyurea, or blend thereof that is treated as discussed herein. A most preferred outer cover layer is a thermoset polyurethane, polyurea or copolymer or hybrid thereof having a Shore D hardness of about 40 to about 50. A most preferred inner cover layer material is a partially-neutralized ionomer comprising a zinc, sodium or lithium neutralized ionomer such as SURLYN® 8940, 8945, 9910, 7930, 7940, or blend thereof having a Shore D hardness of about 63 to about 68.

In another multi-layer cover, single core embodiment, the outer cover and inner cover layer materials and thickness are the same but, the hardness range is reversed, that is, the outer cover layer is harder than the inner cover layer which may be accomplished as described herein.

In an alternative preferred embodiment, the golf ball is a one-piece golf ball having a dimpled surface and having a surface hardness equal to or less than the center hardness (i.e., a negative hardness gradient). The one-piece ball preferably has a diameter of about 1.680 inches to about 1.690 inches, a weight of about 1.620 oz, an Atti compression of from about 40 to 120, and a COR of about 0.750-0.825.

In a preferred two-piece ball embodiment, the single-layer core having a negative hardness gradient is enclosed with a single layer of thermoset cover material as described herein wherein the treated surface has a Shore D hardness of from about 20 to about 80, more preferably about 40 to about 75 and most preferably about 45 to about 70, and comprises any thermosetting cover material known in the art.

Other cover layers that are not so treated may comprise thermoset or thermoplastic materials including polyurethane, polyurea, polyamide, polyester, polyester elastomer, polyether-amide or polyester-amide, partially or fully neutralized ionomer, polyolefin such as polyethylene, polypropylene, polyethylene copolymers such as ethylene-butyl acrylate or ethylene-methyl acrylate, poly(ethylene methacrylic acid) co- and terpolymers, metallocene-catalyzed polyolefins and polar-group functionalized polyolefins and blends thereof. A preferred cover material in the two-piece embodiment is an ionomer (either conventional or HNP) having a hardness of about 50 to about 70 Shore D. Another preferred cover material in the two-piece embodiment is a thermoplastic or thermosetting polyurethane or polyurea. A preferred ionomer is a high acid ionomer comprising a copolymer of ethylene and methacrylic or acrylic acid and having an acid content of at least 16 to about 25 weight percent. In this case the reduced spin contributed by the relatively rigid high acid ionomer may be offset to some extent by the spin-increasing negative gradient core. The core may have a diameter of about 1.0 inch to about 1.64 inches, preferably about 1.30 inches to about 1.620, and more preferably about 1.40 inches to about 1.60 inches.

Another preferred cover material comprises a castable or reaction injection moldable polyurethane, polyurea, or copolymer or hybrid of polyurethane/polyurea. Preferably, this cover is thermosetting but may be a thermoplastic, having a Shore D hardness of about 20 to about 70, more preferably about 30 to about 65 and most preferably about 35 to about 60. A moisture vapor barrier layer, such as disclosed in U.S. Pat. Nos. 6,632,147; 6,932,720; 7,004,854; and 7,182,702, all of which are incorporated by reference herein in their entirety, are optionally employed between the cover layer and the core.

While any of the embodiments herein may have any known dimple number and pattern, a preferred number of dimples is 252 to 456, and more preferably is 330 to 392. The dimples may comprise any width, depth, and edge angle disclosed in the prior art and the patterns may comprises multitudes of dimples having different widths, depths and edge angles. The parting line configuration of said pattern may be either a straight line or a staggered wave parting line (SWPL). Most preferably the dimple number is 330, 332, or 392 and comprises 5 to 7 dimples sizes and the parting line is a SWPL.

In any of these embodiments the single-layer core may be replaced with a 2 or more layer core wherein at least one core layer has a negative hardness gradient. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the objective stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:
a core having an outer surface, a geometric center, and a soft transition region adjacent to the outer surface, the soft transition region having a thickness of about 4 mm or less and comprising about 10 percent to about 45 percent of a trans-polybutadiene isomer; and
wherein the core has an outer surface hardness greater than a hardness at the geometric center to define a positive hardness gradient of about 12 Shore C to 68 Shore C; and a secondary gradient quotient, GQ', from about 4 to 13, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s; and
an outer cover layer formed from a thermoset polyurethane material throughout and having a treated region including at least a cover outer surface and an untreated region extending from a cover inner surface to the treated region;
wherein the treated region is contacted with a thermoset polyurethane microhardness-increasing solution consisting of an isocyanate portion and at least one non-aqueous solvent;
wherein the treated region comprises the isocyanate portion and has a microhardness $M_1$ that is greater than a microhardness $M_2$ of the untreated region, wherein the untreated region is not contacted with the thermoset polyurethane microhardness-increasing solution and does not comprise the isocyanate portion.

2. The golf ball of claim 1, wherein the outer cover layer has a positive microhardness gradient $\Delta M = M_1 - M_2$, wherein $M_1$ is greater than $M_2$ by up to 1 Shore M hardness point.

3. The golf ball of claim 1, wherein the outer cover layer has a positive microhardness gradient $\Delta M = M_1 - M_2$, wherein $M_1$ is greater than $M_2$ by up to about 10 Shore M hardness points.

4. The golf ball of claim 1, wherein the outer cover layer has a positive microhardness gradient $\Delta M = M_1 - M_2$, wherein $M_1$ is greater than $M_2$ by greater than 10 Shore M hardness points.

5. The golf ball of claim 1, wherein the treated region extends inward from the cover outer surface a depth Dtr that is less than a thickness of the outer cover layer.

6. The golf ball of claim 1, wherein the treated region extends inward from the cover outer surface a depth Dtr that is less than a thickness of the untreated region.

7. The golf ball of claim 6, wherein depth Dtr is from about 10 μm to about 350 μm.

8. The golf ball of claim 1, wherein the isocyanate portion consists of at least one of tolylene-2,6-diisocyanate, tolylene-2,4-diisocyanate, 2,2' diphenylmethanediisocyanate, 2,4' diphenylmethanediisocyanate, 4,4'-diphenylmethanediisocyanate, polymethylene polyphenyl polyisocyanate, 1,5-diisocyanatonaphthalene, isophorone diisocyanate (including isomer mixtures), 4,4'-dicyclohexylmethane diisocyanate, hexamethylene-1,6-diisocyanate, m-xylylene diisocyanate, 1,6-hexamethylene diisocyanate, hydrogenated xylylene diisocyanate, tolidine diisocyanate, norbornene diisocyanate, derivatives thereof, and combinations thereof.

9. The golf ball of claim 8, wherein the solvent is selected from ketones, acetates, alcohols, acetic acid and acetic anhydride, aromatic hydrocarbons, esters, polyesters, polyethers, and combinations thereof.

10. The golf ball of claim 9, wherein the ketone is acetone.

11. The golf ball of claim 10, wherein the treated outer surface is crosslinked by a reaction between active hydrogen functionality of the molded thermoset polyurethane material and isocyanates of the isocyanate portion.

12. The golf ball of claim 11, wherein the treated outer surface is exposed to a catalyst solution comprising an organometallic compound and a non-aqueous solvent and wherein the treated region comprises the organometallic compound.

13. The golf ball of claim 5, wherein the molded thermoset polyurethane material is formed from an isocyanate-containing prepolymer and at least one chain extender in an amount sufficient to provide an isocyanate index of at least about 115.

14. The golf ball of claim 5, wherein the molded thermoset polyurethane material is formed from an isocyanate-containing prepolymer and at least one chain extender in an amount sufficient to provide an isocyanate index of 95 or less.

15. The golf ball of claim 14, wherein the at least one chain extender comprises multifunctional polyols, polyamines, polyamides, polymercaptans, polyacids, polyester-based polyols, polybutadiene-based polyols, diamines, diacids and mixtures thereof.

16. The golf ball of claim 5, wherein the outer cover surface is exposed to and contains at least one excess hydroxyl-functional group-containing ingredient prior to contacting the thermoset polyurethane microhardness-increasing solution and comprising the isocyanate portion.

17. The golf ball of claim 16, wherein the hydroxyl-functional group-containing ingredient is butane diol.

18. The golf ball of claim 5, wherein the isocyanate portion comprises at least one isocyanate that is different than each isocyanate of the thermoset polyurethane material of the cover.

19. The golf ball of claim 5, wherein the positive hardness gradient of the core is about 12 Shore C to 45 Shore C and $M_1$ is greater than 50 Shore M.

20. The golf ball of claim 5, wherein the positive hardness gradient of the core is about 12 Shore C to 45 Shore C and $M_1$ is from 70 Shore M to 90 Shore M.

21. The golf ball of claim 5, wherein the positive hardness gradient of the core is about 12 Shore C to 45 Shore C and $M_1$ is greater than 90 Shore M.

22. The golf ball of claim 21, wherein the secondary gradient quotient, GQ', is about 3.75 to about 12.75.

23. A golf ball comprising:
a core having an outer surface, a geometric center, and a soft transition region adjacent to the outer surface, the soft transition region having a thickness of about 4 mm or less and comprising about 2 percent to about 10 percent of a trans-polybutadiene isomer; and wherein the core has an outer surface hardness greater than a hardness at the geometric center to define a positive hardness gradient of about 10 Shore C to 48 Shore C; and a secondary gradient quotient, GQ', from about 1.5 to 7.25, GQ' being defined by the equation:

$$\frac{G' + T}{10 \times COR}$$

where G' is the core positive hardness gradient in Shore C, T is the percent of trans-polybutadiene isomer at the core outer surface, and COR is the coefficient of restitution of the core measured at an incoming velocity of 125 ft/s; and an outer cover layer formed from a thermoset polyurethane material throughout and having a treated region including at least a cover outer surface and an untreated region extending from a cover inner surface to the treated region;

wherein the treated region is contacted with a thermoset polyurethane microhardness-increasing solution consisting of an isocyanate portion and at least one non-aqueous solvent;

wherein the treated region comprises the isocyanate portion and has a microhardness $M_1$ that is greater than a microhardness $M_2$ of the untreated region, wherein the untreated region is not contacted with the thermoset polyurethane microhardness-increasing solution and does not comprise the isocyanate portion.

24. The golf ball of claim 23, wherein the treated region extends inward from the cover outer surface a depth Dtr that is less than a thickness of the untreated region.

25. The golf ball of claim 24, wherein depth Dtr is from about 10 μm to about 350 μm.

26. The golf ball of claim 25, wherein the secondary gradient quotient, GQ', is about 3.75 to about 12.75.

27. A golf ball comprising:

a core having a first outer surface and a geometric center;
wherein the first outer surface has a hardness of about 68 Shore C to 92 Shore C, the geometric center has a hardness of about 45 Shore C to 85 Shore C, and the first outer surface hardness is greater than the geometric center hardness by about 5 to 21 Shore C to define a positive hardness gradient;

an inner cover layer, the inner cover layer comprising an ionomeric material and having a material hardness of about 60 Shore D or greater; and an outer cover layer comprising a polyurea or a polyurethane composition throughout and having a treated region including at least a cover outer surface and an untreated region extending from a cover inner surface to the treated region and having a material hardness of about 60 Shore M or greater;

wherein the treated region is contacted with a thermoset polyurethane microhardness-increasing solution consisting of an isocyanate portion and at least one non-aqueous solvent;

wherein the treated region comprises the isocyanate portion and has a microhardness $M_1$ that is greater than the material hardness of the untreated region, wherein the untreated region is not contacted with the thermoset polyurethane microhardness-increasing solution and does not comprise the isocyanate portion.

28. The golf ball of claim 27, wherein the treated region extends inward from the cover outer surface a depth Dtr that is less than a thickness of the untreated region.

29. The golf ball of claim 28, wherein depth Dtr is from about 10 μm to about 350 μm.

30. The golf ball of claim 29, wherein the secondary gradient quotient, GQ', is about 3.75 to about 12.75.

* * * * *